(12) United States Patent
Jagannath et al.

(10) Patent No.: US 11,115,090 B2
(45) Date of Patent: Sep. 7, 2021

(54) APPARATUS AND METHOD FOR JAMMER RESISTANT PROTOCOL STACK DESIGN

(71) Applicant: ANDRO Computational Solutions, Rome, NY (US)

(72) Inventors: Anu Jagannath, Oriskany, NY (US); Jithin Jagannath, Oriskany, NY (US); Andrew Drozd, Rome, NY (US)

(73) Assignee: ANDRO COMPUTATIONAL SOLUTIONS, Rome, NY (US)

( * ) Notice: Subject to any disclaimer, the term of this patent is extended or adjusted under 35 U.S.C. 154(b) by 0 days.

(21) Appl. No.: 17/075,045

(22) Filed: Oct. 20, 2020

(65) Prior Publication Data

US 2021/0119675 A1   Apr. 22, 2021

Related U.S. Application Data

(60) Provisional application No. 62/923,960, filed on Oct. 21, 2019.

(51) Int. Cl.
| | |
|---|---|
| *H04B 7/04* | (2017.01) |
| *H04B 7/0456* | (2017.01) |
| *H04L 1/00* | (2006.01) |
| *G05D 1/02* | (2020.01) |
| *H04L 27/34* | (2006.01) |

(52) U.S. Cl.
CPC ........ *H04B 7/0456* (2013.01); *G05D 1/0214* (2013.01); *G05D 1/0268* (2013.01); *H04L 1/005* (2013.01); *H04L 27/3405* (2013.01)

(58) Field of Classification Search
CPC .. H04B 7/0456; G05D 1/0124; G05D 1/0268; H04L 1/005; H04L 27/3405
See application file for complete search history.

(56) References Cited

U.S. PATENT DOCUMENTS

| | | | |
|---|---|---|---|
| 2007/0223374 A1* | 9/2007 | Popovski | H04L 1/0015 370/230 |
| 2015/0095726 A1* | 4/2015 | Cameron | H03M 13/118 714/704 |

\* cited by examiner

*Primary Examiner* — Curtis B Odom
(74) *Attorney, Agent, or Firm* — Hoffman Warnick LLC

(57) ABSTRACT

An apparatus and method for providing a protocol stack design which resists active jammers. The apparatus including a transmitter component, the transmitter component including: a rate-2 orthogonal space-time block code (OSTBC) encoder for processing a set of information symbols to produce a set of encoded signals; a precoder module coupled to an output of the rate-2 OSTBC encoder for modifying a signal-to-jammer plus noise ratio (SJNR) of the set of encoded signals; and an eigen-beamformer module coupled to an output of the precoder module, and configured to generate a set of symbols for transmission via a set of eigenmodes of a channel covariance matrix for the transceiver.

23 Claims, 15 Drawing Sheets

APPARATUS AND METHOD FOR JAMMER RESISTANT PROTOCOL STACK DESIGN

BACKGROUND

1. Technical Field

The present disclosure provides an apparatus and method for providing a protocol stack design which resists active jammers. Embodiments of the disclosure are operable for use with a variety of communication systems, including multiple input and multiple output communication systems.

2. Background Art

Undeterred wireless communication is an important requirement in many environments. From deployed military troops to law enforcement officials, lack of reliable communication increases risk and compromises safety. These challenges are further exacerbated when unmanned ground robot vehicles are operated in urban scenarios with severe multipath fading due to clusters of buildings along with active transmissions from unfriendly jammers. A cognitive communication system must be able to adapt to contested operating environments and mitigate interferences from nearby parallel operating radios, intentional hostile jamming, and multipath fading effects. Although software-defined radio (SDR) communication systems may be leveraged in terms of operating frequency, temporal-spatial diversity, transmission rate, and power to suit varying operational requirements and channel conditions, numerous technical issues must be addressed.

There are generally three types of sources of radio frequency interference (RFI) that may result in loss of communication. These disruptive sources include unplanned interference, such as a primary user (PU) (e.g., a commercial network), known users (e.g., a second platoon), and non-cooperative emitters (e.g., jammers). Types of jammers range from barrage jammers that emit constantly on a chosen spectrum to modern cognitive jammers that detect and interfere with critical tactical links. To this extent, communication systems often need to be hardened against RFI.

The severe multipath fading effects associated with constrained operating environments (e.g. a battleground environment) with rugged terrain and non-line-of-sight communication links require a communication system that can adapt to varying channel conditions. Multipath scattering will be further aggravated in an underground environment. Additionally, tactical communication often requires transmission of multimedia data such as surveillance video, images, audio data, etc. Multimedia communication poses significant constraints on communication bandwidth, energy, and quality of experience. These communication constraints coupled with rich multipath scattering effects and hostile jamming can be detrimental to tactical communication links. These escalated communication hardships require an adaptive system that can adapt to the channel fading statistics while also mitigating the jamming and interferences experienced at the receiver.

When communication systems are intended to be mounted on a robot and/or carried by a human operator, minimizing size, weight, and power (SWaP) requirements footprint is a necessity. A small and power efficient design will ensure more portability and ease of operation. A low SWaP footprint will enable robots/operators to carry other essentials and navigate through narrow passages when required. In other words, the physical layer components that are integrated to enhance communication system performance must not compromise operation due to SWaP requirements.

Jamming is a type of denial of service (DoS) attack which poses serious communication hindrance to public safety, tactical, and cellular wireless communication systems. Jammer mitigation is an actively researched topic. The jamming resilience of a system, e.g., a multiple input multiple output (MIMO) and orthogonal frequency-division multiplexing (OFDM) system with interference cancellation and precoding has been studied and considered. Some techniques for jam resistance may include, e.g., MIMO based blind jamming mitigation algorithms, transmit-side beamforming, and/or distributed MIMO decoding algorithms. Although such techniques have been helpful, MIMO-OFDM systems in some cases have remained susceptible to more advanced types of active jamming. Conventional technologies have failed to offer a holistic solution to avoid physical jamming of network information transmitted via an MIMO-OFDM system or other communications network.

SUMMARY

The illustrative aspects of the present disclosure are designed to solve the problems herein described and/or other problems not discussed.

Embodiments of the disclosure provide a communication system, including: a transceiver assembly including a transmitter component, the transmitter component including: a rate-2 orthogonal space-time block code (OSTBC) encoder for processing a set of information symbols to produce a set of encoded signals; a precoder module coupled to an output of the rate-2 OSTBC encoder for modifying a signal-to-jammer plus noise ratio (SJNR) of the set of encoded signals; and an eigen-beamformer module coupled to an output of the precoder module, and configured to generate a set of symbols for transmission via a set of eigenmodes of a channel covariance matrix for the transceiver assembly.

Further embodiments of the disclosure provide a method for transmitting a signal via a transmitter component of a transceiver assembly, the method including: converting a set of information symbols into a set of corresponding orthogonal space-time block code (STBC) symbols; precoding the set of STBC symbols to increase the signal to jammer noise ratio (SJNR) of the STBC symbols; and generating, via an eigen-beamformer, the signal for transmission based on the precoded STBC symbols, the eigen-beamformer being configured to generate the signal via a set of eigenmodes of a channel covariance matrix for the transceiver assembly.

Additional embodiments of the disclosure provide an adaptive transmitter, including: a forward error correction (FEC) encoder for FEC encoding a set of input bits; a quadrature amplitude modulation (QAM) modulator for QAM modulating an output of the FEC encoder to generate a set of information symbols; a rate-2 orthogonal space-time block code (OSTBC) encoder for processing the set of information symbols to produce a set of encoded signals; a precoder module coupled to an output of the rate-2 OSTBC encoder for modifying a signal-to-jammer plus noise ratio (SJNR) of the set of encoded signals, the precoder module including a full-band precoder and a multi-band precoder; and an eigen-beamformer module coupled to an output of the precoder module, and configured to generate a set of symbols for transmission via a set of eigenmodes of a channel covariance matrix for the transmitter.

DETAILED DESCRIPTION

Figure 1:
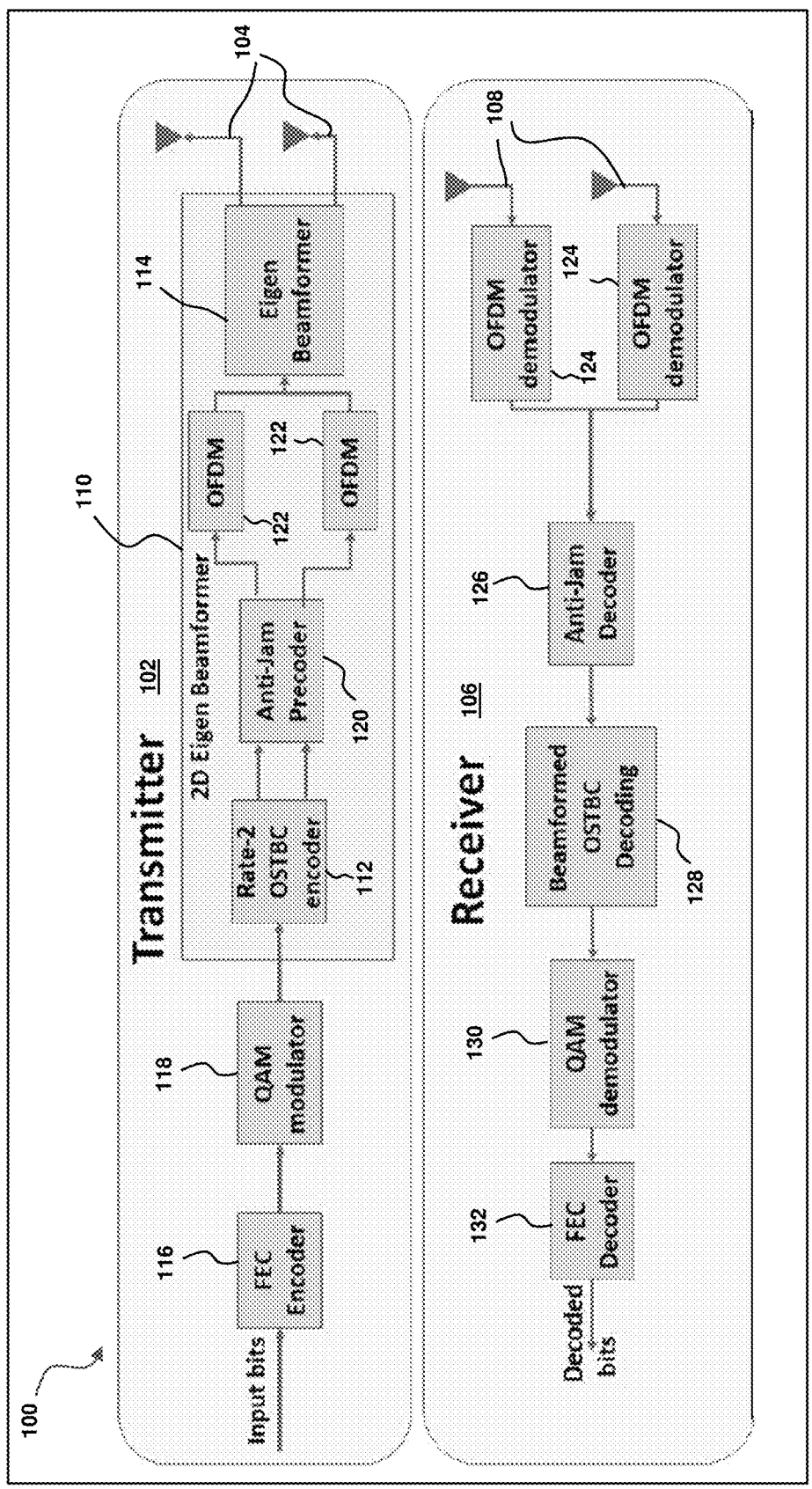
FIG. 1 is a schematic view of an adaptive multiple input multiple output (MIMO) transceiver according to embodiments of the disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Tactical military systems often operate under contested and hostile spectrum conditions. Jamming is one of the primary means of electronic warfare (EW) to disrupt communication. Among the various jamming waveforms, disguised jammers are the most detrimental. Disguised jammers are those transmissions that attempt to mimic the emissions from legitimate transmissions. This aggravates the situation whereby the legitimate receiver will not easily distinguish between the jammer and actual symbols. Another common type of jamming is barrage jamming, whereby a wideband high-power noise signal with Gaussian distribution is emitted. These and other types of jammers may be grouped into two categories: "all band" and "multi-band." An all band jammer affects all subcarriers while the multi-band affects a selected group of subcarriers.

Embodiments of the disclosure provide an apparatus and method for a jammer resistant protocol stack design. Embodiments of the disclosure may operate on the premise that the most disruptive jamming scenarios will involve disguised and barrage jammers. To provide effective mitigation or resistance against jamming for multiple input multiple output (MIMO) systems, embodiments of the disclosure integrate space time block coding (STBC) and various transmit precoding strategies with beamforming, thereby providing a rate efficient protocol stack design with robust jammer resistance. The integration of such features into a protocol stack design provides a holistic solution which implements an adaptive routing strategy in the network layer and provides physical jammer avoidance by localization.

Embodiments of the disclosure provide a jammer-resistant adaptive transceiver design to ensure continued service in the presence of active jamming. In contrast to conventional transceiver systems, embodiments of the disclosure provide jammer resistance built at the physical layer, jammer avoidance in the adaptive routing, and physical jammer avoidance by jammer localization. Jammer resilience of the physical layer design lies in coupling STBC and transmit precoding with eigen-beamforming to yield a precoded, 2D eigen-beamformed system.

A robust, agile, reliable, and jammer-resistant communication system according to embodiments includes an adaptive MIMO transceiver. The adaptive MIMO transceiver employs adaptive transmit eigen-beamforming to leverage the shared channel knowledge between the transmitter and receiver to suppress interference from other scatterers. Enabling signal transmission in the eigenmodes of the channel covariance matrix directs the beams along the dominant multipaths as seen by the receiver. To further maximize the interference rejection capability of the system, orthogonal space-time block coding (OSTBC) may be used in conjunction with adaptive transmitter beamforming. STBC mitigates multipath channel fading effects by introducing spatial and temporal diversity. OSTBC is utilized to guarantees full rate and full transmission diversity while keeping the decoding complexity ($\mathcal{O}$(M) substantially low. This enhances system capacity and bit error performance, especially for multimedia data transmissions.

Detrimental full-band jamming may occur when all orthogonal frequency-division multiplexing (OFDM) subcarriers are jammed and the jamming signal is hard to distinguish from legitimate signals. According to embodiments, controlled redundancy at the symbol level is introduced to raise the signal-to-jammer noise ratio (SJNR). Such symbol level precoding is an effective way to mitigate hostile jamming and improve the achievable bit-error-rate significantly. According to embodiments, the adaptive MIMO transceiver may include two pairs of precoder-decoder modules, one which is suitable for full-band as well as multi-tone scenarios and the other that leverages channel knowledge at the transmitter to selectively raise SJNR on the subcarriers to combat jamming in a few subcarriers.

To ensure dynamic spectrum access (DSA) based on sensed channel characteristics and improve the reliability of the communication network, a hybrid medium access control (MAC) protocol is disclosed herein that enables systems to seamlessly switch between direct and multihop links. This bolsters the system with a second layer of protection from jamming by dynamically choosing frequencies that are not under jamming attack.

In addition to jammer-resilient precoding, jammer localization is employed to obtain physical routes directed away from a jamming source (e.g., upon request of operator). An improved version of the MUSIC (Multiple Signal Classification) algorithm is employed that is adopted to allow for efficient direction of arrival (DoA) estimation under low signal-to-noise ratio scenarios by distinguishing between uncorrelated signals, which ordinary MUSIC fails to achieve.

FIG. 1 is a schematic view of an adaptive MIMO transceiver 100 according to embodiments. As shown, the adaptive MIMO transceiver 100 includes a transmitter component 102 with two transmit antennas 104 and a receiver component 106 with two receive antennas 108.

The transmitter component 102 of the adaptive MIMO transceiver 100 includes a 2D eigen-beamforming system 110, which may include a rate-2 OSTBC encoder 112 and an eigen-beamformer 114. Eigen-beamforming is a MIMO technique whereby system capacity is enhanced by transmitting multiple beams pointing to orthogonal directions along the eigenvectors of a channel's correlation matrix.

The raw input bits to the transmitter component 102 of the adaptive MIMO transceiver 100 are turbo encoded by a forward error correction (FEC) encoder 116 prior to quadrature amplitude modulation (QAM) by a QAM modulator 118. The modulated symbols are input to the 2D eigen-beamforming system 110 and are STBC encoded via the rate-2 OSTBC encoder 112, precoded by an anti-jam precoder 120, orthogonal frequency-division multiplexing (OFDM) modulated by OFDM modulator 122, and beamformed by the eigen-beamformer 114 before transmission over the transmit antenna 104. After receipt and synchronization at the receiver component 106, the received symbols are OFDM demodulated by OFDM demodulator 124, anti-jam decoded by an anti-jam decoder 126, and decoded by a beamformed OSTBC decoder 128. Finally, the decoded symbols are QAM demodulated by a QAM demodulator 130 and are turbo decoded by a FEC decoder 132 to retrieve the input bits. Additional information describing the operation of various components of the adaptive MIMO transceiver 100 is provided herein.

Multiantenna transmitter beamforming for power-limited systems transmits repetitive symbols over the transmit antennas to achieve bit error rate (BER) performance. However, this can severely affect the data rate of the system by order of a repetition factor. In other words, only one symbol will be transmitted in P time slots over the N transmit antennas, reducing the rate by 1/P. According to embodiments, to mitigate the rate deficiency involved with such beamforming, the OSTBC encoder 112 and eigen-beamformer 114 are configured to provide rate-2 OSTBC encoding and eigen-beamforming, respectively, to increase the data rate while achieving the reduced BER benefits of beamforming. The desired eigenbeams may be power-loaded according to a spatial water-filling principle. Combining STBC with beamforming results in a 2D eigen beamformer that provides the benefit of both schemes without any complexity increase or rate reduction. The adaptive MIMO transceiver 100 thus adapts the power loading on the eigenbeams and the eigenvectors to direct the beams based on an estimated (e.g., 2×2) channel matrix.

Tactical systems often use multimedia communications that require high capacity communication links. STBC mitigates the effect of fading in wireless channels by exploiting the spatial and temporal diversity in MIMO systems. Exploiting two antennas to transmit additional information symbols in a given epoch will help achieve higher spectral efficiency.

Rate-2 Orthogonal Space Time Block Coding

The rate of a STBC is measured by the number of distinct symbols transmitted over the epochs (channel uses) and is expressed as, $$\text{Rate}_{STBC} = \frac{\text{\# distinct symbols}}{\text{\# epochs}} \text{symbols/s/Hz}$$

The well-known Alamouti STBC that was adopted by IEEE802.11n and 3GPP LTE transmits two symbols over two channel uses resulting in a rate of 1 symbols/s/Hz. Increasing the rate while preserving the orthogonality as well as ensuring low decoding complexity is a challenging STBC design problem which is a subject of growing interest.

Figures 2, 3, 4:
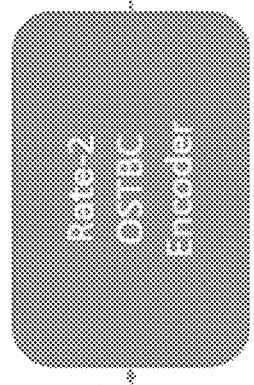
FIG. 2 depicts an example of the structure of a rate-2 orthogonal space-time block coding (OSTBC) encoder according to embodiments of the disclosure.
FIG. 3 depicts an example of a convolutional encoder according to embodiments of the disclosure.
FIG. 4 depicts an example of a recursive systematic convolutional (RSC) encoder according to embodiments of the disclosure.

The rate-2 OSTBC encoder 112 in the transmitter component 102 of the adaptive MIMO transceiver 100 is configured to transmit four symbols over two channel uses via two transmit antennas 104, which consequently guarantees a rate of 2 symbols/s/Hz. This implies that the adaptive MIMO transceiver 100 can operate at twice the throughput of any other MIMO device that operates using Alamouti or similar rate-1 code in the same operating environment. An example of the structure of the rate-2 OSTBC encoder 112 is depicted in FIG. 2.

For simplicity of notation, each encoded symbol at time slot (epoch) t from transmit antenna n is denoted as $$C_{tn} = s_i \sin \phi_j - s_{i+1}^* \cos \phi_j, \; i=0, 1, \ldots, N-1, j=0,1.$$

The 2×2 STBC matrix can thus be represented as, $$\text{time} \downarrow \begin{bmatrix} C_{11} & C_{12} \\ -C_{12}^* & C_{11}^* \end{bmatrix}.$$
$\qquad\qquad\text{space} \rightarrow$ Consider a flat fading wireless environment between the transmitter component 102 and receiver component 106. Let the fading channel between the receive antenna i and two transmit antennas (indices 0 and 1) be denoted as $h_i=[h_{0i}\; h_{1i}]$. For ease of understanding, consider the transmission of four symbols mapped to $C_{11}$ and $C_{12}$ transmitted over two time slots, 0 and 1. The received signal at receive antenna i during first two time slots are $$y_i^0 = C_{11} h_{0i} + C_{12} h_{1i} + n_i^0$$

$$y_i^1 = C_{12}^* h_{0i} + C_{11}^* h_{1i} + n_i^1.$$

The signal received during the subsequent time slot 1, can be rewritten as $$y_i^{1*} = C_{11} h_{1i}^* + C_{12} h_{0i}^* + n_i^{1*}.$$

Now, the received signal can be rewritten in matrix form as, $$\begin{bmatrix} y_i^0 \\ y_i^{1*} \end{bmatrix} = -\underbrace{\begin{bmatrix} h_{0i} & h_{1i} \\ h_{1i}^* & -h_{0i}^* \end{bmatrix}}_{h_i^{EVCM}} \begin{bmatrix} C_{11} \\ C_{12} \end{bmatrix} + \begin{bmatrix} n_i^0 \\ n_i^{1*} \end{bmatrix}$$

where $h_i^{EVCM}$ is the equivalent virtual fading channel matrix. With the signal modeling introduced, the decoder logic can now be presented. Equalizing the received symbol matrix at the receiver with the virtual fading channel matrix would result in the following expression, $$\begin{bmatrix} a_i^0 \\ a_i^1 \end{bmatrix} = \begin{bmatrix} h_{0i}^2 + h_{1i}^2 & 0 \\ 0 & h_{0i}^2 + h_{1i}^2 \end{bmatrix} \begin{bmatrix} C_{11} \\ C_{12} \end{bmatrix} + h_i^{EVCM^H} \begin{bmatrix} n_i^0 \\ n_i^{1*} \end{bmatrix}$$

where the notation $(\blacksquare)^H$ represents the Hermitian transpose (conjugate transpose). The sufficient statistic of $\{s_1, s_2\}$ is $$r^0 = \frac{\sum_{i=0}^{1} a_i^0}{2}$$

$$r^1 = \frac{\sum_{i=0}^{1} a_i^1}{2}$$

To perform conditional Maximum Likelihood (ML) decoding, the intermediate signals for a given value of $s_{2i}$ are deduced as $$\widehat{r^t} = r^t - \frac{\alpha}{2}((-s_{2i}^*)\cos\phi_j).$$

Here, $s_{2i}$ is an element of the M-QAM (quadrature amplitude modulation) constellation set. For each value of $s_{2i}$, a conditional ML estimate of $s_{2i-1}^{ML}$ is deduced by performing a low complexity M-QAM decoding of the intermediate signal $\widehat{r^t}$. A corresponding cost function of each ML estimate is obtained as $$\gamma(s_{2i-1}^{ML} | s_{2i}) = \left| r^t - \frac{\alpha}{2}(s_{2i-1}^{ML}\sin\phi_0 - s_{2i}^*\cos\phi_1) \right|^2.$$

The optimal symbol decision will be the one that corresponds to the minimum cost function $$\widehat{s_{2i}} = \arg\min_{s_{2i}} \gamma(s_{2i-1}^{ML} | s_{2i}).$$

Thus, the conditional ML symbol estimates are $\widehat{s_{2i}}$ and its corresponding $\widehat{s_{2i-1}^{ML}}$. The complexity of this decoder is very low to the order of $\mathcal{O}(M)$ which is significantly low compared to the other 2×2 rate-2 STBCs such as Matrix-C, Golden-ML, and Golden-near ML.

Forward Error Correction

Forward error correction (FEC) is an information theory scheme that transmits parity bits to enable error detection and correction. An FEC system adds parity bits to the transmitted information to allow for error detection and correction at the receiver. According to embodiments, the adaptive MIMO transceiver 100 includes an FEC encoder 116 (e.g., a Turbo encoder) in its communication chain. Since a recursive systematic convolutional (RSC) encoder is the constituent of a Turbo encoder, RSC encoders will be introduced before delving into Turbo codes.

A convolutional code is generated by passing the information bits through a linear finite-state shift register. The input bits are shifted through the register k bits at a time to generate the corresponding n parity bits. The rate of convolutional encoder can be obtained as r=k/n. The shift register consists of K−1 memory elements or flipflops to store the bits. The parameter K of a convolution encoder is referred to as the constraint length.

An RSC encoder has two distinctions from conventional encoders; (i) the input bits are transmitted along with the parity bits and (ii) the encoder is a linear feedback shift register which feeds the output bits back to the input. Examples of a convolutional encoder 200 and a RSC encoder 210 are depicted in FIGS. 3 and 4, respectively.

The RSC encoder 210 in FIG. 4 is a rate 1/3 encoder with constraint length K=3. The generator functions are denoted as $g_f$=[1 1 1], $g_x$=[1 0 0], $g_y$=[1 1 0], $g_z$=[0 1 0]. Equivalently, the generator polynomials can be represented as $$G(D) = \begin{bmatrix} 1 & \dfrac{1+D}{1+D+D^2} & \dfrac{D}{1+D+D^2} \end{bmatrix}.$$

There exist multiple methods to decode convolutional codes. The decoding of convolutional codes can entail a maximum likelihood or maximum a posteriori approach, both of which are discussed in greater detail in subsequent sections.

The Viterbi algorithm can perform either soft decision decoding or hard decision decoding depending on whether the demodulator output is soft or hard. The Viterbi algorithm may use Hamming distance for hard decision decoding and Euclidean distance for soft decision decoding.

Figure 5:
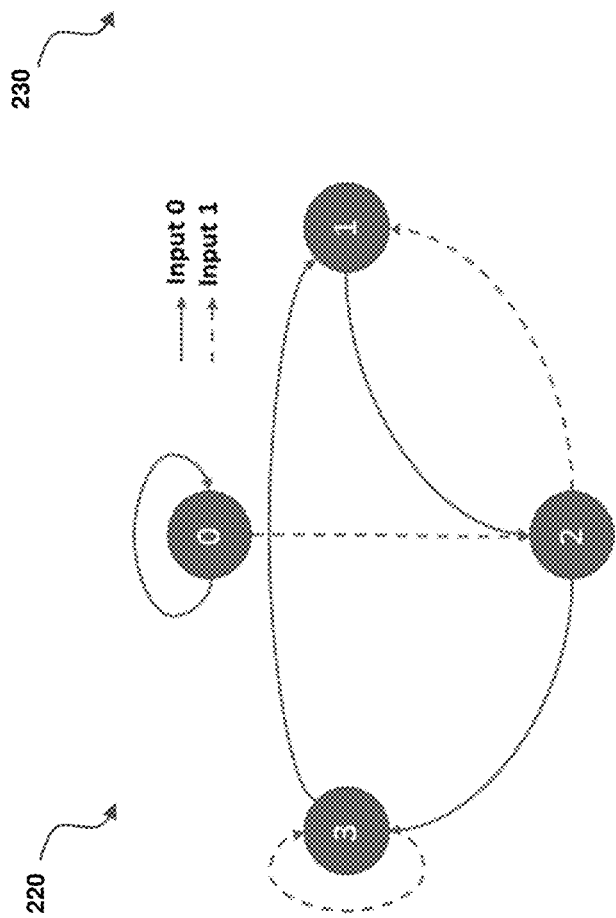
FIG. 5 depicts a state transition diagram of the RSC encoder shown in FIG. 4 according to embodiments of the disclosure.

As an example, the decoder logic for the RSC encoder 210 in FIG. 4 will be discussed. A state transition diagram 220 of the RSC encoder 210 is shown in FIG. 5.

A convolutional encoder with constraint length K can have $2^{K-1}$ possible states. Since the output of the RSC encoder 210 generates three coded bits at a time for each input bit, three received hard/soft bits from the received sequence are considered at a time to compute hamming/Euclidean distance, branch metric, path metric, and survivor path index until the end of the received sequence.

Figure 6:
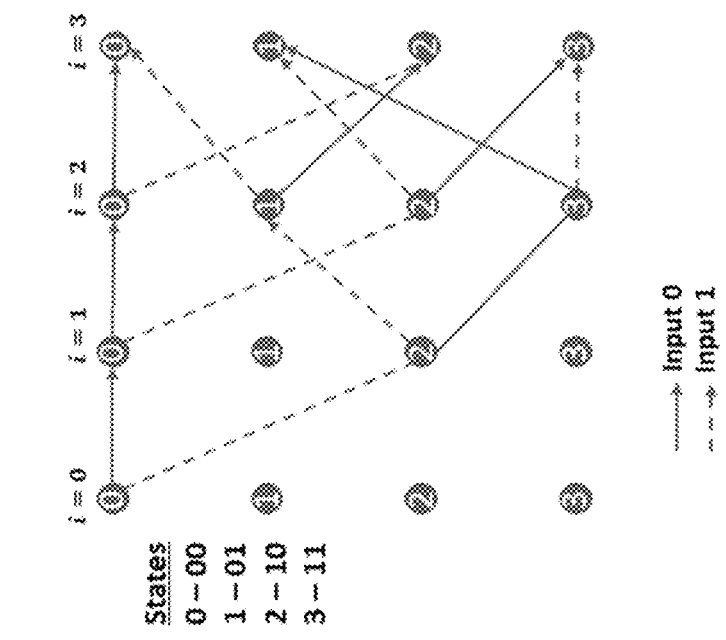
FIG. 6 depicts a trellis diagram corresponding to the state transition diagram shown in FIG. 5 according to embodiments of the disclosure.

Typically, convolutional encoding always starts from state 00 and hence the Viterbi decoder follows the same underlying assumption. Viterbi decoding involves finding a path in a trellis that minimizes an additive metric. A trellis diagram 230 up to time index 3 is shown in FIG. 6. The index i=0 represents the initial start state from 00.

As can be seen for indices i=1, 2, the path metrics of valid states are equal to their branch metric due to the presence of a single branch terminating at each valid state. But at index i=3, each state has two arriving branches and the path metric will be equivalent to the minimum of the branch metrics of either branches and the corresponding minimum metric branch will be the survivor path. Due to the presence of tail bits, the encoder will terminate at state 00. Thus, starting from the last computed survivor path at state 00, the previous state can be estimated. Knowing the current and previous state and using the state transitions the input bit that caused the transition can be estimated. Hence the entire sequence can be decoded.

The BCJR (Bahl, Cocke, Jelinek, and Raviv) algorithm is a symbol-by-symbol maximum a posteriori (MAP) decoding algorithm. The decoder receives soft demodulator output bits y and decodes $u_i$ using the log-likelihood ratio (LLR)

$$L(u_i) = \ln \frac{P(u_i = +1)}{P(u_i = -1)}.$$

The BCJR computes a posteriori LLR defined by $$L(u_i) = \ln \frac{P(u_i = +1 \mid y)}{P(u_i = -1 \mid y)}$$

$$= \ln \frac{\sum_{S_{high}} P(s', s, y)}{\sum_{S_{low}} P(s', s, y)}$$

$$= \ln \frac{\sum_{S_{high}} \alpha_{i-1}(s')\gamma_i(s', s)\beta_i(s)}{\sum_{S_{low}} \alpha_{i-1}(s')\gamma_i(s', s)\beta_i(s)}$$

where $s_{high}$, $s_{low}$ are the state transitions caused due to input $u_i=+1$ and $u_i=-1$ respectively. To this end, the following can be defined $$y_i^N = (y_i, \ldots, y_N)$$

$$\alpha_{i-1}(s') = P(s', y_i^{i-1})$$

$$\beta_i(s) = P(y_{i+1}^N \mid s)$$

$$\gamma_i(s', s) = P(y_i, s \mid s')$$

The conditional probability $\gamma_i(s', s)$ is the probability that the received symbol is $y_i$ at time i and current state s. The received symbol $y_i$ is the received version of $x_i$ which is the n-bit codeword generated at the encoder output for each message/information bit $u_i$. Now, $\gamma_i(s', s)$ can be further expressed as $$\gamma_i(s', s) = P(y_i, s \mid s')$$
$$= P(s \mid s') P(y_i \mid s', s)$$
$$= P(u_i) P(y_i \mid x_i)$$
$$= \frac{P(u_i)}{(\pi N_0)^{n/2}} \exp - \frac{\|y_i - x_i\|^2}{N_0}$$
$$= C_i \exp \frac{u_i L(u_i)}{2} \exp\left(\frac{L_c}{2}(y_i^p x_i^p + y_i^s x_i^s)\right)$$

where the superscripts and p corresponds to systematic and parity bits and $$L_c = \frac{4\sqrt{E_c} y_i^s}{N_0}$$

denotes the channel reliability. Bear in mind, that $x_i^s = u_i$. The probabilities $\alpha$ and $\beta$ can be computed using the following recursions, $$\alpha_i(s) = \sum_{s'} \alpha_{i-1}(s')\gamma_i(s', s), \; \alpha_0(s) = \begin{cases} 1, & s = 0 \\ 0, & s \neq 0 \end{cases}$$

$$\beta_{i-1}(s') = \sum_{s} \beta_i(s)\gamma_i(s', s), \; \beta_N(s) = \begin{cases} 1, & s = 0 \\ 0, & s \neq 0 \end{cases}$$

In both cases, the quantity $\gamma_i(s', s)$ is required and must be deduced first. The probability $\alpha$ and $\beta$ correspond to forward and backward recursions respectively. Having computed all the probabilities, the a posteriori L values can be obtained as $\{L(u_1|y), L(u_2|y), \ldots, L(u_N|y)\}$ and essentially $\hat{u} = \{u_1, u_2, \ldots, u_N\}$ as $$\hat{u}_i = \begin{cases} 1, & L(u_i) \geq 0 \\ 0, & L(u_i) < 0 \end{cases}$$

thereby obtaining the decoded message bits.

Figure 7:
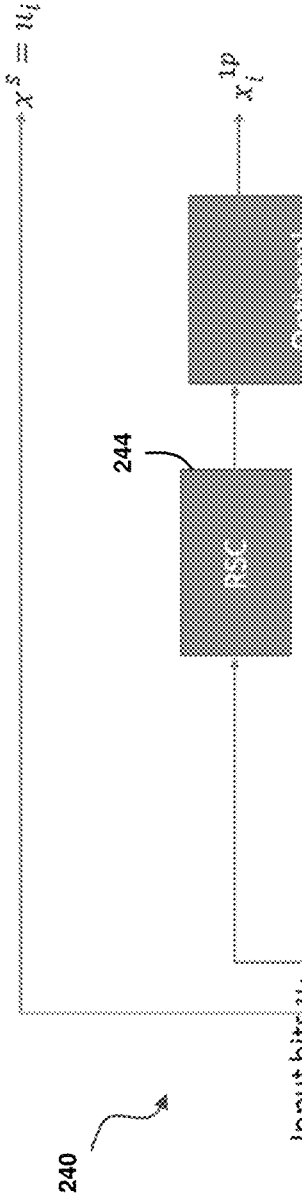
FIG. 7 depicts a turbo encoder according to embodiments of the disclosure.

Parallel concatenated convolutional codes with interleaving are called Turbo codes. FIG. 7 depicts a turbo encoder 240 which is a recursive systematic encoder that employs two RSC encoders 242, 244 in parallel, where the second RSC encoder 244 is preceded by an interleaver 246. Optional puncturing 248 may be provided. The interleaver 246 is a block pseudo random interleaver that reorders bits in the information sequence prior to feeding them to the second RSC encoder 244. A turbo code that employs a constituent RSC encoder with feedback polynomial $g_f(D)$ and feedforward polynomial $g_p(D)$ can be represented as $$\left[1 \frac{g_p(D)}{g_f(D)}\right].$$

Use of the interleaver 246 produces codewords that have relatively few nearest neighbors, i.e., the codewords are relatively sparse. Thus, the coding gain is due in part to the sparse codewords provided by the interleaver 246 in conjunction with the size of the interleaver 246. It has been shown that interleaver size has an effect by a factor of 1/N on the error bound of turbo codes. This effect that drastically reduces the error bound of turbo codes is referred to as interleaver gain.

The aforementioned a posteriori LLR can be rewritten as per Bayes' rule as $$L(u_i) = \ln \frac{P(y|u_i=+1)}{P(y|u_i=-1)} + \underbrace{\ln \frac{P(u_i=+1)}{P(u_i=-1)}}_{\text{a priori}}.$$

Figure 8:
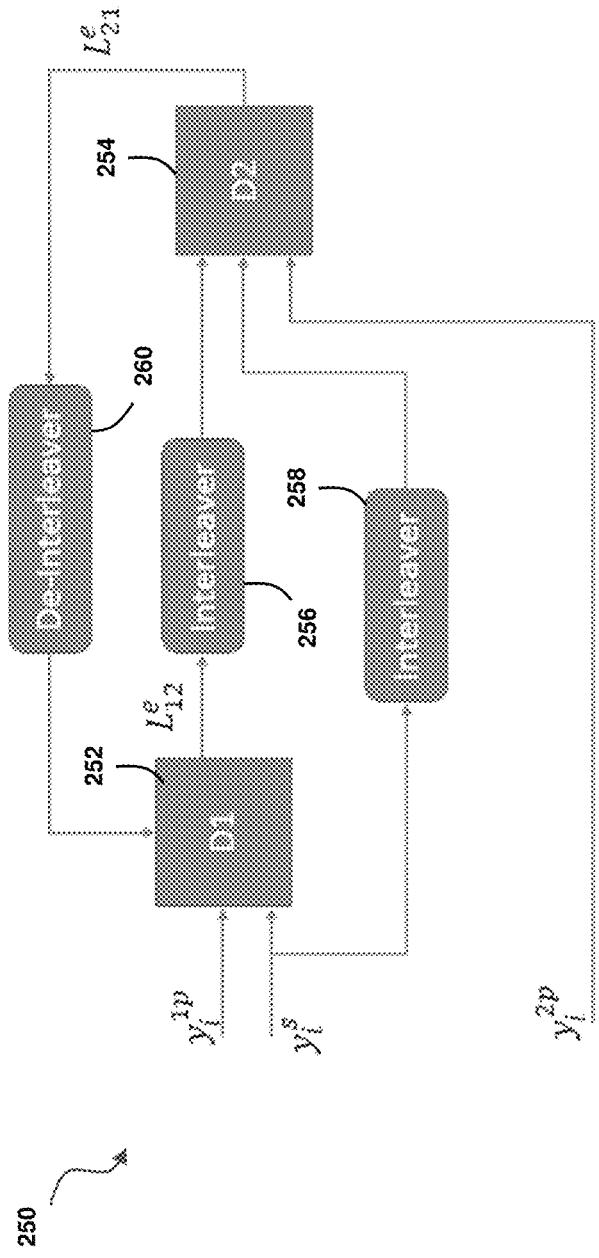
FIG. 8 depicts an interactive turbo maximum a posteriori probability (MAP) decoder according to embodiments of the disclosure.

For conventional decoders, the a priori information is zero. However, for iterative decoders where soft or extrinsic information from subsequent decoders feeds into the other, the a priori corresponds to the soft fed information. FIG. 8 depicts an interactive turbo maximum a posteriori probability (MAP) decoder 250 including first and second decoders 252, 254, interleaver 256, interleaver 258, and de-interleaver 260.

The first decoder 252 receives soft information from the second decoder 254 using information, i.e., the parity not available at the first decoder 252. Similarly, the first decoder 252 feeds soft information to second decoder 254. In terms of the extrinsic information the transition probability can be rewritten as $$\gamma_i(s', s) =$$
$$C_i \exp \frac{u_i L_e(u_i)}{2} \exp\left(\frac{L_c}{2}(y_i^p x_i^p + y_i^s u_i)\right) = \exp \frac{u_i}{2}(L_e(u_i) + L_c y_i^s)\gamma_e(s', s)$$

Now, the a posteriori LLR can be rewritten as $$L(u_i) = \underbrace{L_c y_i^s}_{\text{channel value}} + \underbrace{L_e(u_i)}_{\text{a priori}} + \ln \underbrace{\frac{\sum_{S_{high}} \alpha_{i-1}(s')\gamma_i(s',s)\beta_i(s)}{\sum_{S_{low}} \alpha_{i-1}(s')\gamma_i(s',s)\beta_i(s)}}_{\text{extrinsic}}$$

For instance, at any given iteration first decoder 252 computes $$L^1(u_i) = L_c y_i^s + L_e^{21}(u_i) + L_e^{12}(u_i)$$

where $L_e^{21}(u_i)$ is the extrinsic information passed from the second decoder 254 to the first decoder 252 whereas $L_e^{12}(u_i)$ is the extrinsic information passed from the first decoder 252 to the second decoder 254.

Referring again to FIG. 1, the adaptive MIMO transceiver 100 includes an anti-jam precoder 120 for providing two types of anti-jam precoding strategies in various embodiments: full-band (FB) precoding and multi-band (MB) precoding. FB precoding combats jamming on all subcarriers by raising the symbol power on all corresponding subcarriers. The FB precoding is performed on the symbol stream post STBC encoding. The STBC encoding provided by the rate-2 OSTBC encoder 112 produces two symbol streams corresponding to the two transmit antennas 104.

MB precoding is adopted to provide jammer resistance against disguised multi-band jammers. MB precoding is similar to FB precoding in the mathematical precoding and decoding except only a few affected subcarriers are precoded. Owing to the power constraint, if the jammed subcarriers are known or can be estimated, the precoding can be power-efficient by adopting the MB precoding of only the relevant jammed subcarriers. Such a scheme can be adopted in multi-band jammed scenarios.

Embodiments of the disclosure are operable to couple STBC and transmit precoding with eigen-beamforming to yield a precoded 2D eigen-beamformed system. The remarkable performance gain attained with the 2D eigen-beamformed design has been demonstrated via experimental testing. The most disruptive jamming strategies such as disguised and barrage jamming were considered to validate the jammer resiliency of the cumulative system with FB precoding and MB precoding schemes, and significantly outperformed conventional systems which lack precoding. In some cases, embodiments of the disclosure will offer reduced size and weight as compared to conventional transceivers, while providing robust resilience to multiple types of jamming.

Transmitter eigen-beamforming is a MIMO technique whereby the system capacity is enhanced by transmitting multiple beams pointing to orthogonal directions along the eigenvectors of the channel's correlation matrix. General beamforming transmits repetitive symbols over the transmit antennas to achieve bit error performance. However, this can severely affect the data rate of the system by an order of a repetition factor. In other words, only 1 symbol will be transmitted in P time slots, reducing the rate by 1/P. Therefore, according to embodiments of the disclosure, rate-2 STBC coding is integrated with eigen-beamforming to increase the data rate while achieving the bit error performance benefits of beamforming. The optimal eigenbeams are power-loaded according to a spatial water-filling principle. Combining STBC with beamforming results in a 2D eigen-beamformer 110 that enjoys the benefit of both schemes without any complexity increase or rate reduction.

Figure 9:
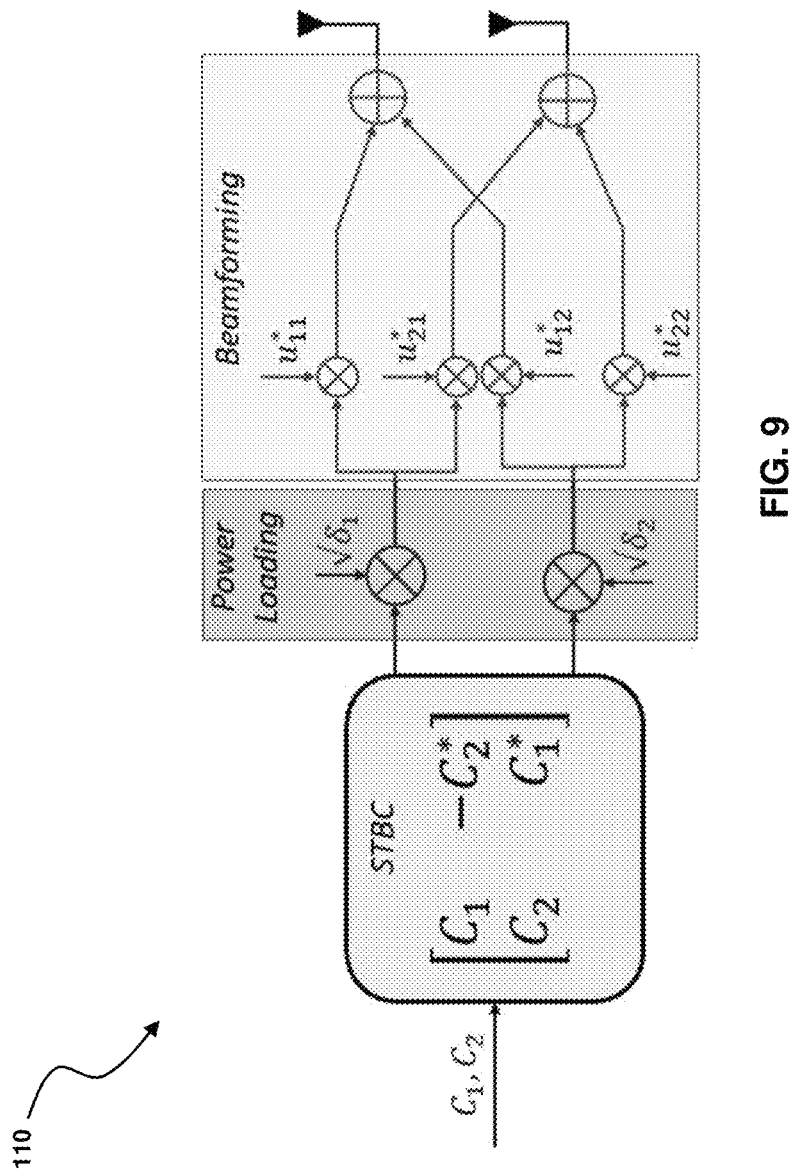
FIG. 9 depicts a simplified view of a 2D eigen-beamformer according to embodiments of the disclosure.

The optimal 2D eigen-beamformer is $$B_{2D} = CD_h^{1/2} U_h^H$$

where C is the rate-2 STBC, $D_h$ is the diagonal power loading matrix, and $$U_h = \begin{bmatrix} u_{11} & u_{12} \\ u_{21} & u_{22} \end{bmatrix}$$

is the eigenvector matrix (whose columns ($u_a$, $u_b$) are eigenvectors of channel correlation matrix $R_{hh}$). The spectral decomposition of $R_{hh}$ is $$R_{hh} = U_h D_h^{1/2} U_h^H$$

where $D_h = \text{diag}(\delta_1, \delta_2)$. The 2D eigen-beamformer 110 can be simplified into the structure depicted in FIG. 9. For notational simplicity, let us represent the 2×2 STBC as $$C = \begin{bmatrix} C_1 & -C_2 \\ -C_2^* & C_1^* \end{bmatrix}.$$

Now, the symbols over two time slots at transmit antenna 1 and 2 can be represented as $$[\sqrt{\delta_1}C_1u_{11}^* + \sqrt{\delta_2}C_2u_{12}^* - \sqrt{\delta_1}C_2u_{11}^* + \sqrt{\delta_2}C_1u_{12}^*] \quad \text{tx1:}$$

$$[\sqrt{\delta_1}C_1u_{21}^* + \sqrt{\delta_2}C_2u_{22}^* - \sqrt{\delta_1}C_2u_{21}^* + \sqrt{\delta_2}C_1u_{22}^*] \quad \text{tx2:}$$

Converting this back to the 2×2 matrix, we get $$\text{time}\downarrow \begin{bmatrix} \sqrt{\delta_1}\ C_1u_{11}^* + \sqrt{\delta_2}\ C_2u_{12}^* & \sqrt{\delta_1}\ C_1u_{21}^* + \sqrt{\delta_2}\ C_2u_{22}^* \\ -\sqrt{\delta_1}\ C_2u_{11}^* + \sqrt{\delta_2}\ C_1u_{12}^* & -\sqrt{\delta_1}\ C_2u_{21}^* + \sqrt{\delta_2}\ C_1u_{22}^* \end{bmatrix}.$$
$$\text{space}\rightarrow$$

Considering the channel matrix $$h = [\,h_0 \quad h_1\,] = \begin{bmatrix} h_{00} & h_{01} \\ h_{10} & h_{11} \end{bmatrix},$$

the received symbols at the i-th receiver antenna during time slot-0 can be expressed as $$y_i^0 = (\sqrt{\delta_1}C_1u_{11}^* + \sqrt{\delta_2}C_2u_{12}^*)h_{0i} + (\sqrt{\delta_1}C_1u_{21}^* + \sqrt{\delta_2}C_2u_{22}^*)h_{1i} + n_i^0 = (\sqrt{\delta_1}u_{11}^*h_{0i} + \sqrt{\delta_1}u_{21}^*h_{1i})C_1 + \sqrt{\delta_2}u_{12}^*h_{0i} + \sqrt{\delta_2}u_{22}^*h_{1i})C_2 + n_i^0.$$

Similarly, at time slot-1 can be represented as, $$y_i^{1*} = (\sqrt{\delta_2}u_{12}h_{0i}^* + \sqrt{\delta_2}u_{22}h_{1i}^*)C_1 - (\sqrt{\delta_1}u_{11}h_{0i}^* + \sqrt{\delta_1}u_{21}h_{1i}^*)C_2 + n_i^{1*}.$$

Expressing this in the equivalent virtual channel matrix (EVCM) manner we get, $$\begin{bmatrix} y_i^0 \\ y_i^{1*} \end{bmatrix} =$$

$$\underbrace{\begin{bmatrix} (\sqrt{\delta_1}\ u_{11}^*h_{0i} + \sqrt{\delta_1}\ u_{21}^*h_{1i}) & (\sqrt{\delta_2}\ u_{12}^*h_{0i} + \sqrt{\delta_2}\ u_{22}^*h_{1i}) \\ (\sqrt{\delta_2}\ u_{12}h_{0i}^* + \sqrt{\delta_2}\ u_{22}h_{1i}^*) & (\sqrt{\delta_1}\ u_{11}h_{0i}^* + \sqrt{\delta_1}\ u_{21}h_{1i}^*) \end{bmatrix}}_{G_i} \begin{bmatrix} C_1 \\ C_2 \end{bmatrix} + \begin{bmatrix} n_i^0 \\ n_i^{1*} \end{bmatrix}$$

where $G_i$ is the equivalent virtual channel fading matrix. The equivalent form after channel equalization can be written as $$\begin{bmatrix} a_i^0 \\ a_i^1 \end{bmatrix} = \begin{bmatrix} \delta_1\|h_iu_a\|^2 + \delta_2\|h_iu_b\|^2 & 0 \\ 0 & \delta_1\|h_iu_a\|^2 + \delta_2\|h_iu_b\|^2 \end{bmatrix} \begin{bmatrix} C_1 \\ C_2 \end{bmatrix} + G_i^H \begin{bmatrix} n_i^0 \\ n_i^{1*} \end{bmatrix}.$$

Conditional ML decoding can be now performed on the received symbols detailed above.

Figure 10:
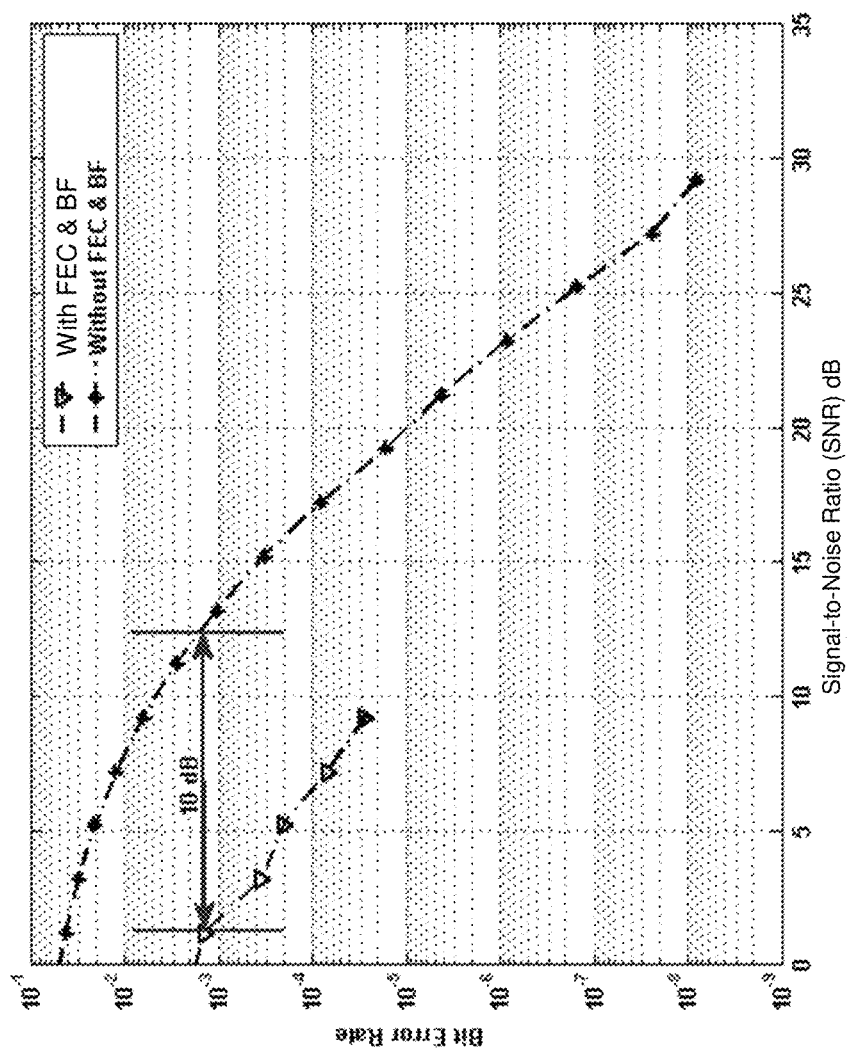
FIG. 10 is a plot of bit error rate versus signal-to-noise ratio for a rate-2 STBC system with and without forward error correction (FEC) and eigen-beamforming according to embodiments of the disclosure.

One advantage of integrating FEC and beamforming with a rate-2 STBC system is illustrated in the plot shown in FIG. 10, which compares bit error rate versus signal-to-noise ratio for a rate-2 STBC system with and without FEC and eigen-beamforming. All of the testing considers a rich, scattering, flat-fading Rayleigh channel. Each data point on the curve is an average of 10 k independent, identical repetitions. As indicated in FIG. 10, the rate-2 STBC system with FEC and beamforming provides a gain of 10 dB to achieve a bit error rate of $10^{-3}$.

Jammer-Resistant Symbol Precoding

As detailed above, the adaptive MIMO transceiver 100 according to embodiments includes an anti-jam precoder 120 for providing full-band (FB) and multi-band (MB) precoding. Among various jamming waveforms, disguised jammers are the most detrimental. Disguised jammers are those transmissions that attempt to mimic the transmissions from legitimate transmissions. Here, the symbol set of the jammer waveforms are drawn from the same constellation as the legitimate waveforms. This aggravates the situation whereby the legitimate receiver will find it hard to distinguish between the jammer and actual symbols.

Full-band precoding combats disguised all-band as well as multi-band jammers by raising the symbol power on all $N_c$ subcarriers. The precoding is performed on the symbol stream after STBC encoding. The precoding provided by the anti-jam precoder 120 is performed as per $$s_{Fprec} = Px$$

where $$P = \begin{bmatrix} \text{diag}(\rho_1, \rho_2, \ldots, \rho_k) \\ 0 \end{bmatrix}_{N_c \times K}$$

is the precoder matrix and $x_{K+1}$ is the STBC encoded symbol vector. The precoded symbol stream traverses the rest of the transmit chain in the adaptive MIMO transceiver 100. At the receiver end, the decoding performed by the anti-jam decoder 126 using a simple matrix multiplication $$\hat{x} = D\tilde{s}_{Fprec}$$

on the received symbol stream $\tilde{s}_{Fprec}$ with the decoder matrix $$D = \begin{bmatrix} \text{diag}\left(\frac{1}{\rho_1}, \frac{1}{\rho_2}, \ldots, \frac{1}{\rho_k}\right) & 0 \end{bmatrix}_{K \times N_c}.$$

Figure 11:
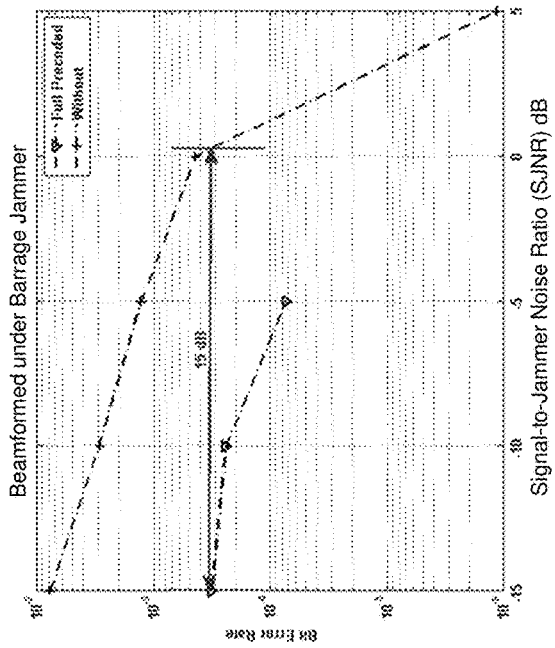
FIG. 11 is a plot of the bit error rate of a full-band precoded transceiver system with eigen-beamforming versus without precoding in the presence of a disguised all-band jammer under varying power levels according to embodiments of the disclosure.
Figure 12:
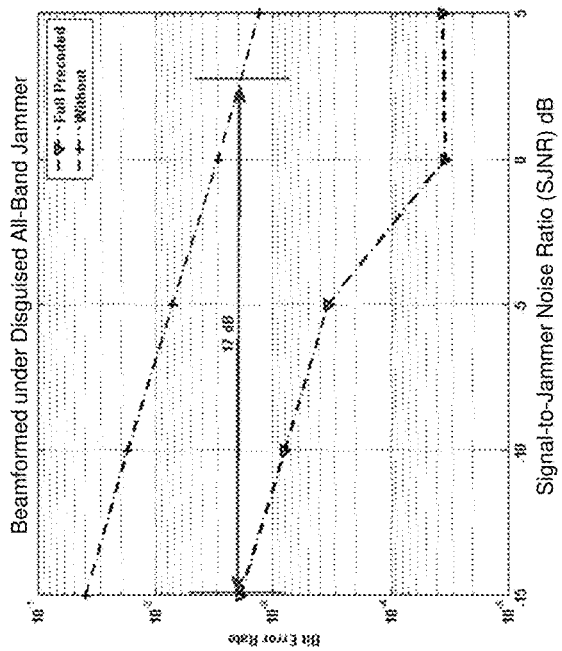
FIG. 12 is a plot of full-band precoded system performance under barrage jamming at varying power levels according to embodiments of the disclosure.
Figure 13:
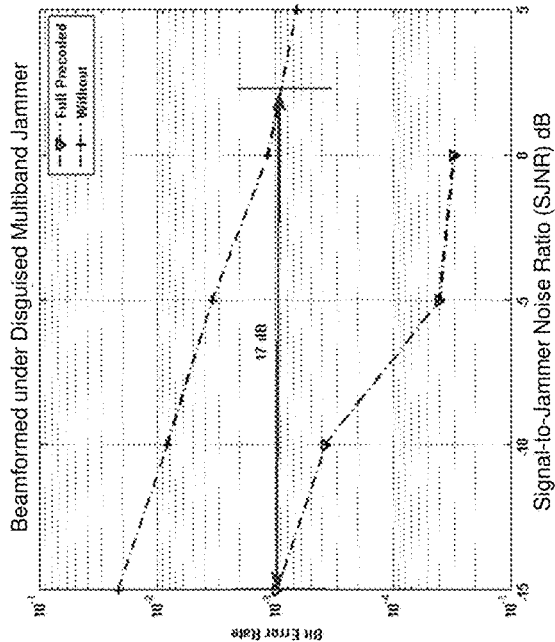
FIG. 13 is a plot of full-band precoded system performance under disguised multi-band jamming at varying power levels according to embodiments of the disclosure.

The benefits of full-band precoding of the symbol stream prior to transmission in a jammer scenario is showcased by the plots in FIGS. 11-13. FIG. 11 depicts the bit error rate performance of a full-band precoded transceiver system (such as adaptive MIMO transceiver 100) with beamforming versus without precoding in the presence of a disguised all-band jammer under varying power levels. The low bit error rate performance of the full-band precoded system is evident and further grants a 17 dB SJNR gain for a $10^{-3}$ error rate indicating jammer-resilient operation capability. Similarly, FIG. 12 depicts the full-band precoded system performance under barrage jamming at varying power levels. The low bit error trend with precoding follows along with a 15 dB SJNR gain. FIG. 13 depicts the full-band precoded system performance under disguised multi-band jamming at varying power levels. Once again, full-band precoding provides a lower error rate performance along with a 17 dB SJNR gain implying enhanced jammer resilience.

Figure 14:
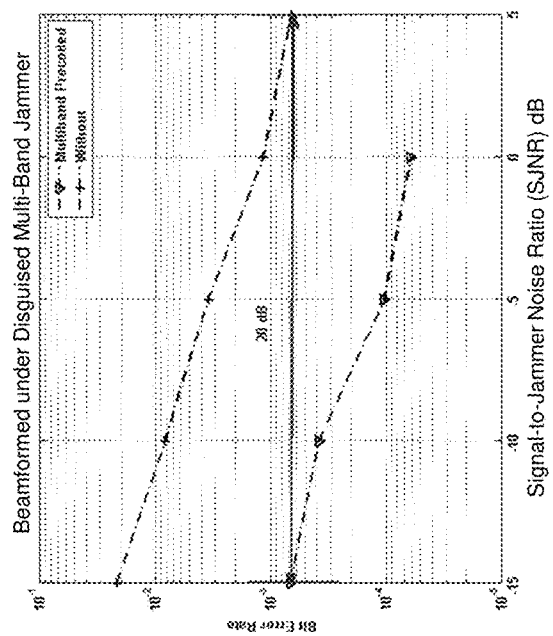
FIG. 14 is a plot of multi-band precoded system performance under varying power levels of disguised multi-band jamming according to embodiments of the disclosure.

Multi-band precoding may be adopted to provide jammer resistance against disguised multi-band jammers. Multi-band precoding is similar to full-band precoding in the mathematical precoding and decoding except here, only a few affected subcarriers are precoded. FIG. 14 depicts the multi-band precoded system performance under varying power levels of disguised multi-band jamming. The reduced error curve is evident along with the 20 dB lower SJNR, which indicates the improved jamming resilience provided when using a multi-band precoding scheme.

Figure 16:
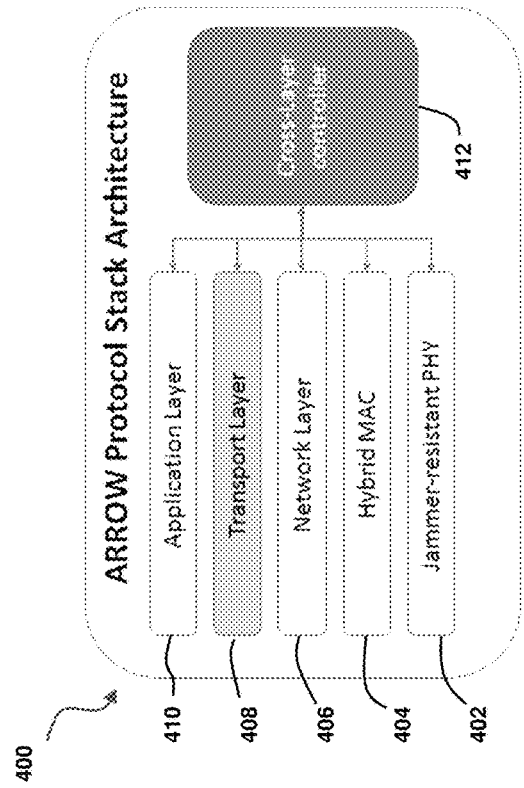
FIG. 16 depicts a protocol stack for jammer resistance according to embodiments of the disclosure.
Figure 15:
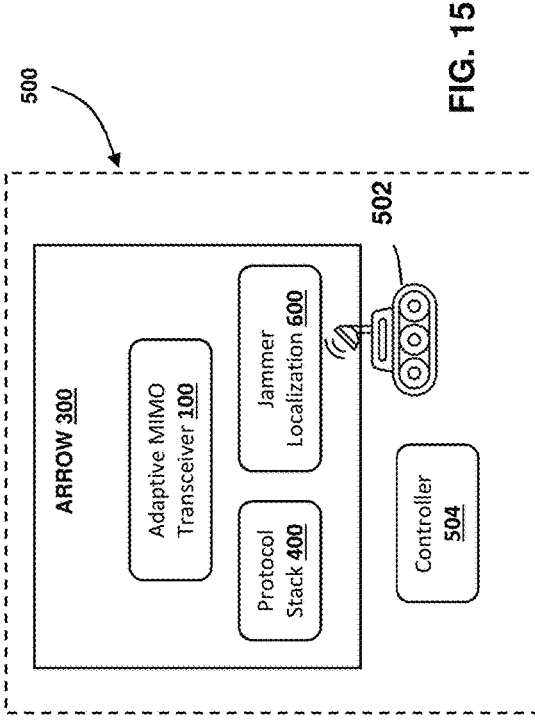
FIG. 15 depicts an adaptive radio for robotic warfare (ARROW) node according to embodiments of the disclosure.

Embodiments of the disclosure provide the adaptive MIMO transceiver 100 in the form of an adaptive radio for robotic warfare (ARROW) 300 (FIG. 15), which includes the adaptive MIMO transceiver 100 and a protocol stack 400 for jammer resistance. As described herein, the protocol stack 400 (FIG. 16) may include, e.g., a jammer-resistant physical layer 402, a hybrid medium access control (MAC) layer 404, a network layer 406, a transport layer 408, and an application layer 410, designed in a cross-layer manner to allow interlayer information exchange via a cross-layer controller 412.

The hybrid MAC layer 404 works in close collaboration with the network layer 406 to perform cross-layer optimization. This cross-layer optimization ensures reliable communication even when a robot 502 (FIG. 15) carrying the ARROW 300 might not be accessible through a direct link. The disclosed hybrid MAC layer 404 adopts a combination of time division multiple access (TDMA) and carrier sense multiple access (CSMA/CA). The network layer 406 is responsible for the multihop routing in a jammer avoidance route. The transport layer 408 is responsible for the end-to-end transport control of the packets injected by the application layer 410. All of the layers are controlled by the cross-layer controller 412, which is configured to facilitate cross-layer optimization for the multihop routing and hybrid MAC 404. The protocol stack 400 is designed to enable mobile ad hoc network (MANET) capability to the deployed ARROWs 300.

Hybrid MAC

Figure 17:
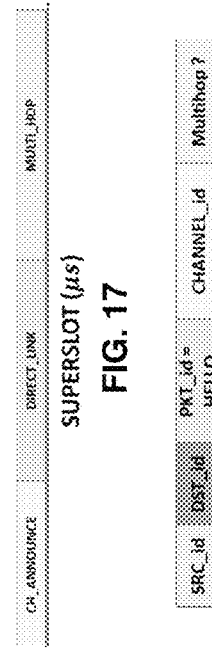
FIG. 17 depicts a timing diagram for the hybrid medium access control (MAC) layer of the protocol stack of FIG. 16 according to embodiments of the disclosure.
Figure 18:
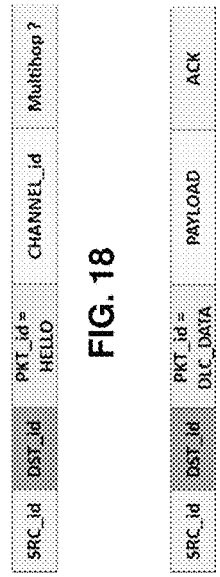
FIG. 18 depicts the structure of HELLO packets according to embodiments of the disclosure.

Communication in the ARROW mobile ad hoc network (MANET) can be considered as exchange of messages between ARROW nodes 500 (FIG. 15), each of which include an ARROW 300, robot 502, and controller 504. Each controller 504 is associated with a robot 502, and exchanges communication information back and forth. The disclosed hybrid scheme is a combination of TDMA and CSMA/CA. The MAC timing diagram is depicted in FIG. 17. CH_ANNOUNCE is the channel announcement duration during which the various ARROW controllers 504 announce (broadcast) their channels in a time-slotted manner. Every other ARROW node 500 will listen during this period to learn the controller 504-robot 502-channel associations of their respective network. The channel announcements are by means of HELLO packets whose structure is depicted in FIG. 18. The HELLO packets indicate whether the communication is going to be direct or multihop to perform the adaptive routing for link reliability.

Figure 19:
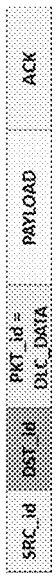
FIG. 19 depicts the structure of DLC_DATA packets according to embodiments of the disclosure.

DIRECT_LINK is the duration during which each controller 504-robot 502 pair will directly exchange data packets on their respective channels. The direct exchanges will occur in a Time Division Duplexed (TDD) manner. The direct packets in the DIRECT_LINK phase, DLC_DATA are depicted in FIG. 19. The last field specifies the ACK field and indicates whether the previous packet from its communicating node has been received or not. Those ARROW nodes 500 that announced multihop mode in the CH_ANNOUNCE will also attempt to directly exchange packets in this duration to attempt their chance at direct communication rather than waiting for MULTI_HOP duration.

In the MULTI_HOP duration, all ARROW nodes 500 participate to assist the controller 504 that announced multihop mode in relaying its packets to its intended robot 502. The multihop communication occurs in a hop-by-hop manner and adopts CSMA/CA for medium access. The entire length of the timing frame that comprise the CH_ANNOUNCE, DIRECT_LINK, and MULTI_HOP is referred to as a SUPERSLOT. Likewise, the entire MANET communication is formed of several SUPERSLOTs.

Figure 20:
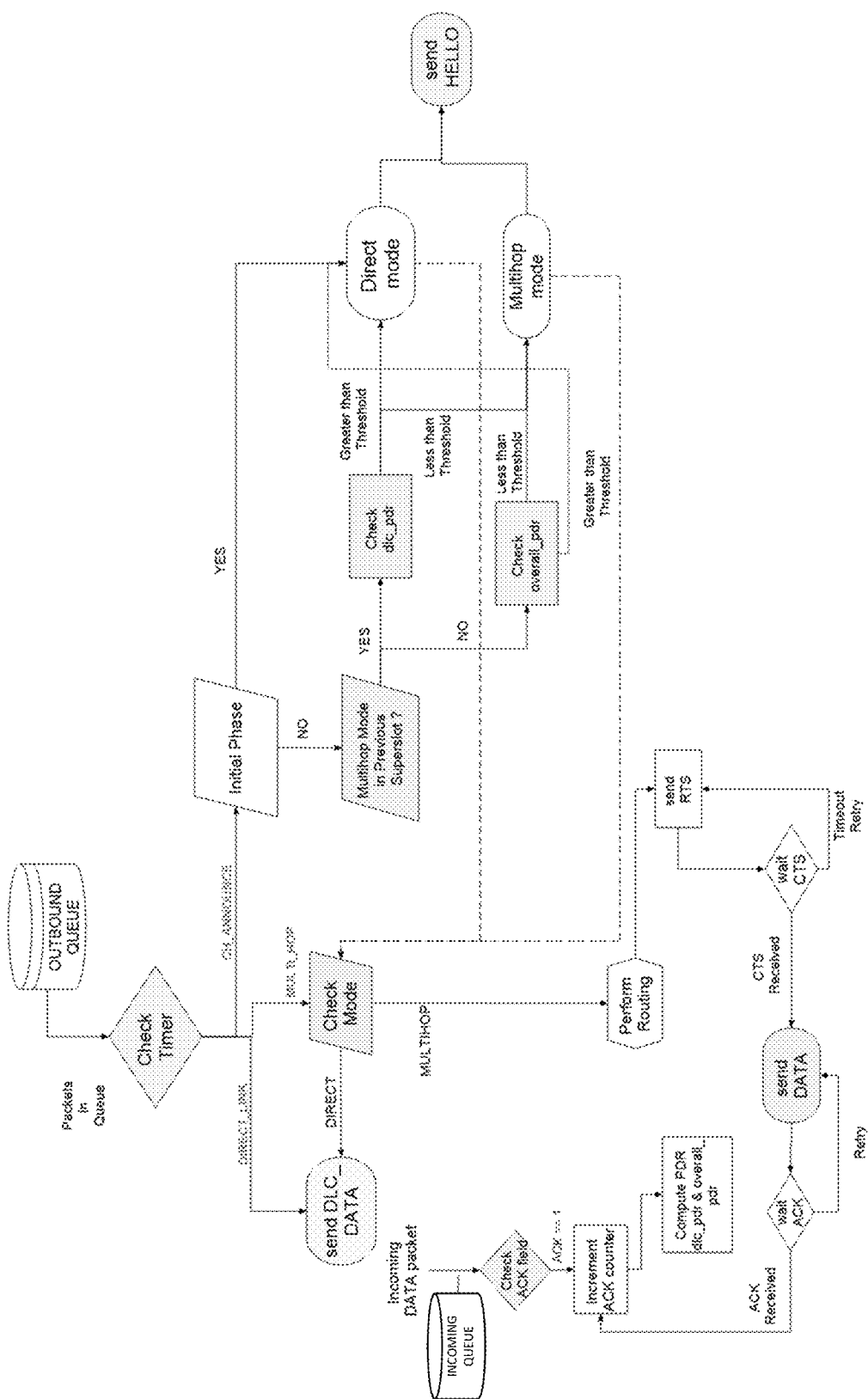
FIG. 20 depicts the process flow within the various layers of the protocol stack according to embodiments of the disclosure.

Each ARROW node 500 keeps tab on the number of positive ACKs it receives during the direct packet exchanges to measure the packet delivery ratio which will indicate the communicating link's quality. If the packet delivery ratio is below an acceptable threshold, the controller 504 of the ARROW node 500 will announce the incoming ("HELLO") packet with multihop mode enabled during the subsequent CH_ANNOUNCE in the next SUPERSLOT. As previously mentioned, the controller 504 will still attempt direct DLC_DATA exchanges in the DIRECT_LINK phase. The packet delivery ratio obtained in this phase will be used to decide whether the ARROW node 500 will continue operating in the multihop mode or will switch back to direct mode. The process flow within the various layers of the ARROW protocol stack 400 is depicted in FIG. 20.

A simulation of an embodiment of the disclosure considered an outdoor scenario where the ARROW nodes 500 are deployed outdoor in a grid topology with a weak line-of-sight (LoS) and rich scattering environment. Further, the distance dependent relative small-scale fading path loss is taken into account in the simulations. The channel is an additive white Gaussian noise channel with shadow fading. The simulation includes two channel models which include the above-mentioned shadow fading margin, relative distance dependent pathloss, weak LoS, and rich scattering into account Rayleigh and Rician fading models. In this example, a weak LoS exists with several scattered rays arriving at the ARROW nodes 500. The model that best fits this scenario is the Rician model.

Figure 21:
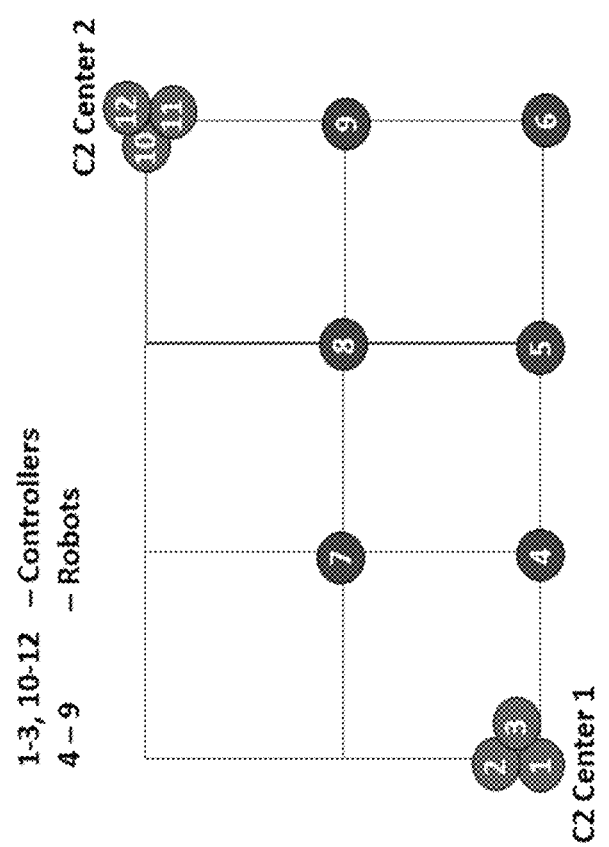
FIG. 21 depicts a grid topology for simulation according to embodiments of the disclosure.

As depicted in FIG. 21, the simulation provided a grid topology on a two-dimensional cartesian coordinate system with six controllers 504 (labelled 1-3 and 10-12) and six robots 502 (labelled 4-9). The controllers are divided geographically into two groups of three, with controllers (1, 2, 3) located in origin (0, 0) and controllers (10, 11, 12) in coordinate (30, 20). The performance was simulated for 30 SUPERSLOTs. The connectivity achieved with adaptive routing (ARROW) versus static routing, which doesn't have the ability to switch to multihop, was analyzed.

Figure 22:
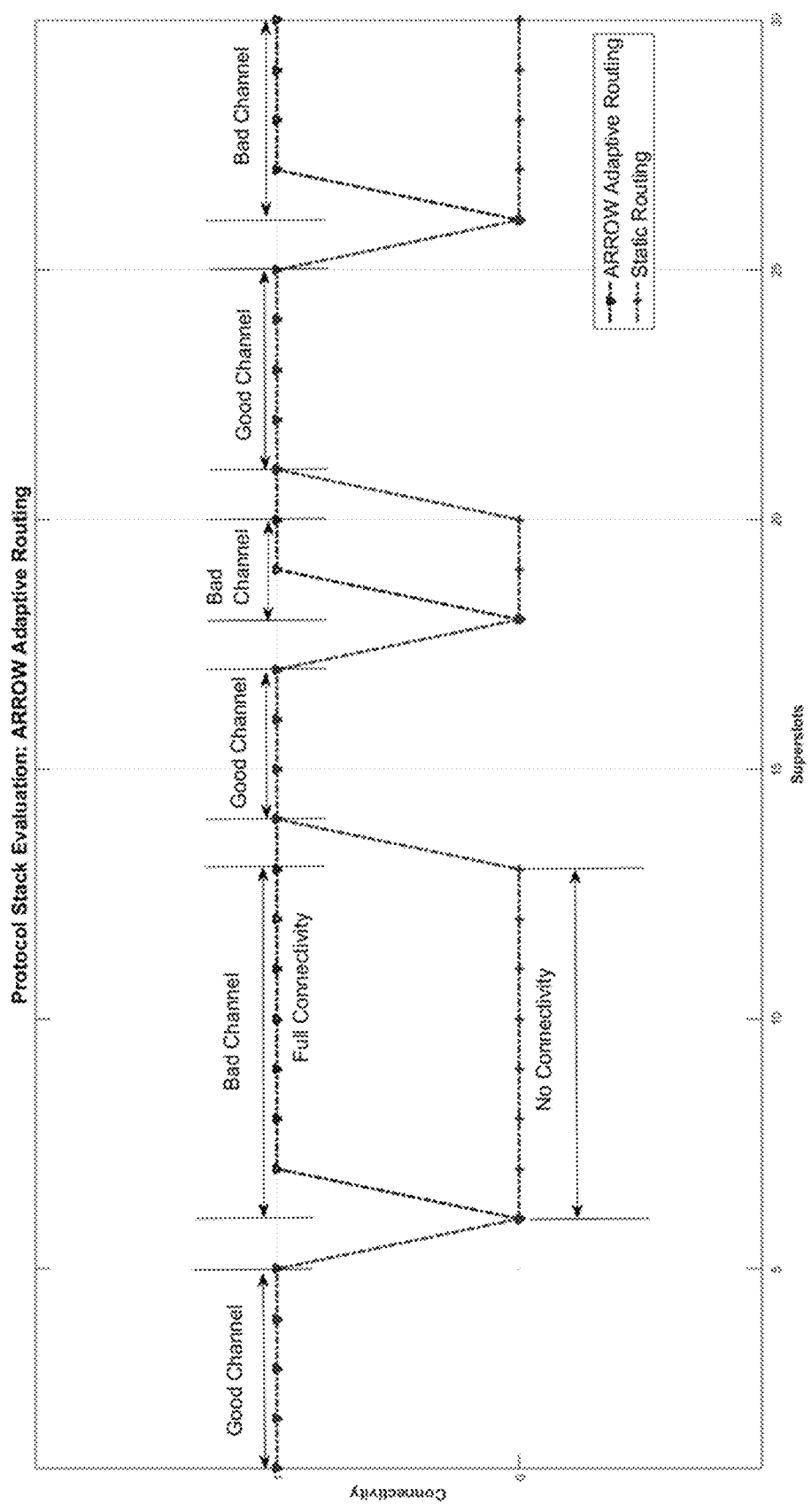
FIG. 22 shows the connectivity achieved with both adaptive and static routing under varying link quality according to embodiments of the disclosure.

FIG. 22 shows the connectivity achieved with both adaptive and static routing under varying link quality. It is evident that the capability of adaptive routing to switch to multihop when a decline in packet delivery ratio is detected during bad link quality allows adaptive routing to maintain connectivity unlike static routing which suffers link brakeage due to its adaptive nature.

The performance of the protocol stack 400 of an ARROW 300 has been simulated under various scenarios. This was to capture any unintended behavior posed by the protocol stack 400 as well as observe the network performance for longer runtimes. The network topology followed the one shown in FIG. 21.

The timing for the evaluation followed CH_ANNOUNCE=67.4 μs, DIRECT_LINK=5.25 ns, MULTI_HOP=134.8 ns, DATA_size=546B, HELLO_size=13B, and number of SUPERSLOTs=13. The evaluations were also conducted for a non-adaptive system to represent a conventional protocol stack that is incapable of adapting itself to the dynamic network conditions. Hence, the protocol stack 400 of the ARROW 300 is benchmarked against this conventional system. The channel conditions are simulated to remain in a good state for the first 5 SUPERSLOTs and deteriorate to a poor state in the remaining SUPERSLOTs. It is to be noted that the PHY layer of the conventional system still uses the ARROW PHY layer to show that even though a conventional system matches up to the ARROW 300 from a PHY layer perspective, the agility of the protocol stack 400 gives the ARROW 300 the edge in its deployed network scenario. Additionally, we have simulated two scenarios for each system; (a) network only has a single session (S=1) and (b) network has two simultaneous sessions (S=2) where the C2 node 1 communicates with its robot 5 and the C2 node 10 communicates with its robot 6.

Figure 23:
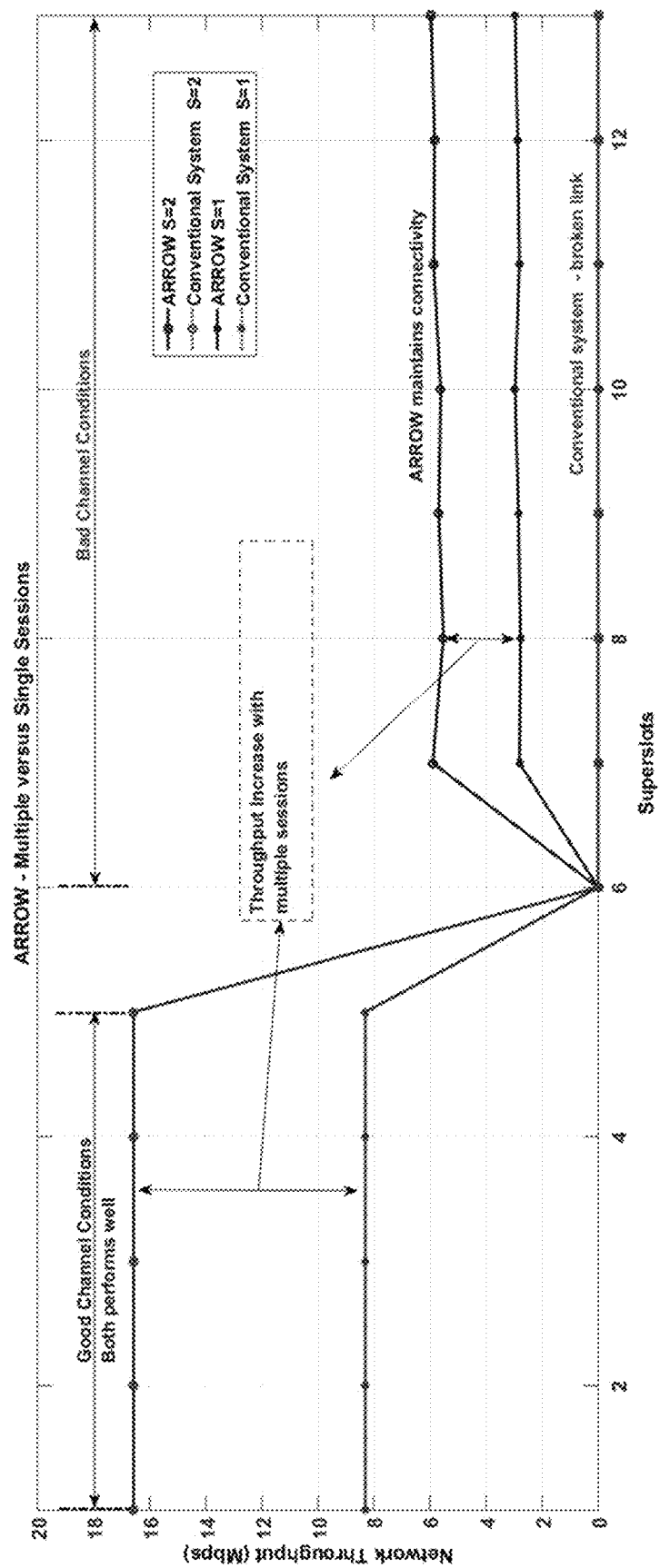
FIG. 23 shows the performance of an ARROW in contrast to a conventional transceiver system deployed in a network scenario according to embodiments of the disclosure.

FIG. 23 shows the performance of the ARROW 300 in contrast to a conventional transceiver system deployed in the said network scenario. From a throughput trend perspective, while the channel conditions are good, both systems deliver good performance as expected. After the 5$^{th}$SUPERSLOT when channel conditions deteriorate, it is evident that both systems dropped performance. ARROW 300 being adaptive, however, sensed the channel deterioration and switched from direct link communication with the robot to multihop such that the other available robots in its vicinity collaborated in the multiple hop communication. The graph demonstrates the ARROW 300 reestablishing communication link by switching to multihop and delivering an overall network throughput of 5.67 Mbps and 2.8 Mbps for the two (S=2) and single (S=1) session scenarios, respectively, while the conventional system stays disconnected until the duration of poor channel quality. This implies in a real tactical scenario where the channel conditions can deteriorate dynamically, the agile adaptive protocol stack 400 of the ARROW 300 will maintain connectivity while delivering acceptable throughput rates while conventional system will suffer link breakage.

The performance evaluation thus far from the network and PHY perspectives utilized a lower order modulation of 4-QAM. Another notable feature of the ARROW 300 is its ability to adapt modulation under varying channel quality. This implies that the ARROW 300 will attempt to send as much data as possible with higher order modulation while channel conditions are good and switch to a lower order modulation while channel conditions deteriorate. This PHY layer feature was integrated into our the protocol stack 400 of the ARROW 300 such that the cumulative effect of the adaptive routing in addition to the adaptive modulation delivers significant performance gain. The conventional system in this case doesn't have the ability to switch to higher order modulation and stays bound to the original lower order it was configured to operate in.

Figure 24:
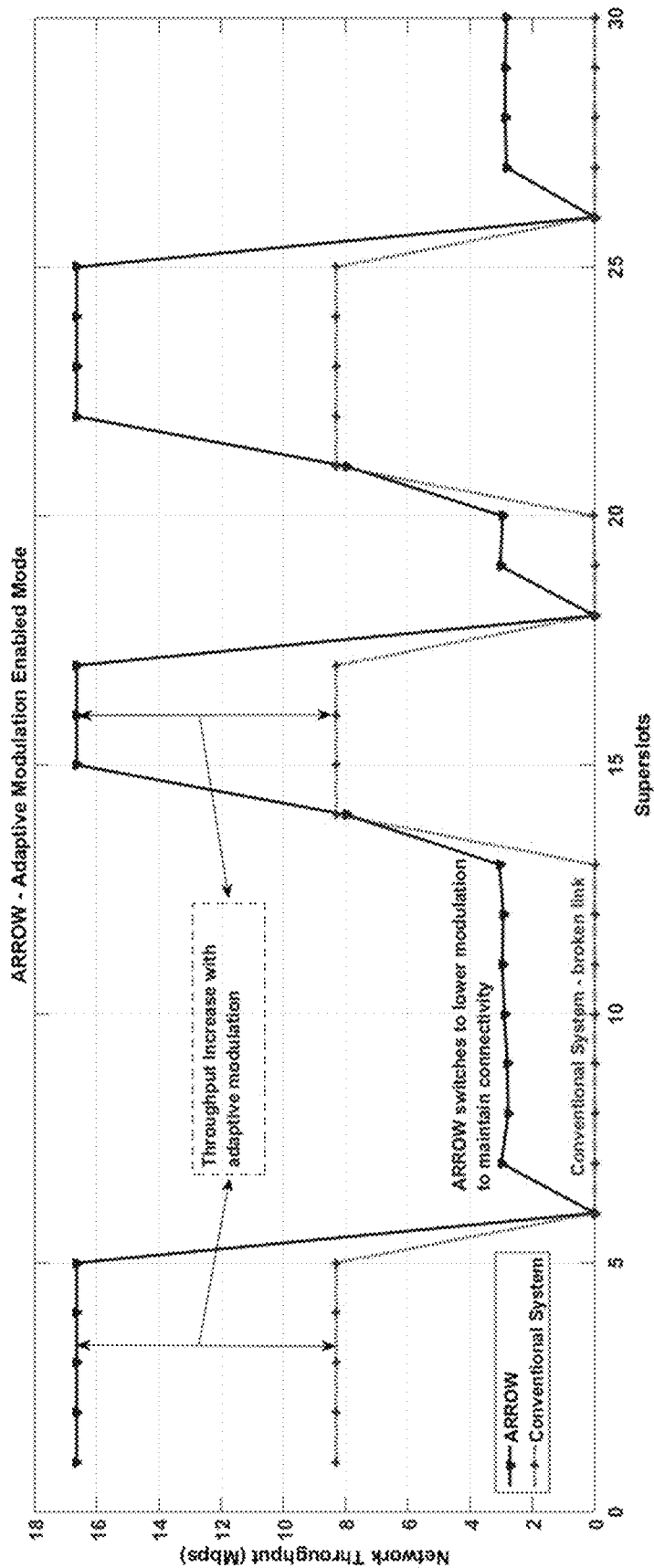
FIG. 24 depicts the throughput increase of an ARROW when switching to a higher order modulation.

The timing of the MAC follows the same as the previous evaluation but for 30 SUPERSLOTs. Here, for the sake of intuitively conveying the effect of adaptive modulation, a single session scenario is simulated for the ARROW 300 and conventional systems. The channel conditions remain good for SUPERSLOTs 1-5, 14-17, 21-25 and are poor for the other SUPERSLOTs. FIG. 24 lucidly demonstrates the throughput increase of the ARROW 300 by switching to higher order 16-QAM. The ARROW 300 attains a throughput of 16.64 Mbps (twice that of conventional) in the good channel state and 3.02 Mbps in poor channel conditions. Conventional system as observed suffers link breakage and communication loss when channel deteriorates.

Physical Jammer Avoidance-Localization

The ARROW 300 (or ARROW node 500) may include a jammer localization module 600 (FIG. 15), which is configured to estimate the direction of arrival (DoA) (θ) bearing of an active jammer. The bearing estimate will allow a physical control module on a robot 502 or an unmanned ground vehicle (UGV) to physical steer away from the direction of a jammer signal arrival when operationally feasible. The multiple signal classification (MUSIC) algorithm may be used by the jammer localization module 600 to estimate the spatial spectrum function. The spatial spectrum function will be a function of θ. The approach involves resolving for θ that maximizes the spatial power spectrum density.

The MUSIC algorithm is a widely used DoA estimation technique in spatial array processing/MIMO systems. MUSIC derives its name from its ability to resolve DoA of multiple interfering signals. The gist of the MUSIC algorithm lies in decomposing an array output covariance matrix into signal and noise subspaces to form a spatial spectrum function. The array output covariance matrix can be obtained by sample averaging the array output data. Eigendecomposing the covariance matrix of the array output separates it into signal and noise subspaces. Arranging the eigenvalue-eigenvectors in descending order, the first columns correspond to signal subspace while the remaining columns corresponds to noise subspace. To account for uncorrelated RFI sources or low signal-to-noise ratio scenarios, an improved-MUSIC algorithm is disclosed herein which employs a transition matrix to perform conjugate reconstruction of the covariance matrix.

The MUSIC algorithm separates the signal and noise subspaces from the received signal followed by evaluating a spatial spectrum function which is dependent on the incident angle of the jammer signal.

Consider W jammer sources impinging a linear array of ARROW nodes equipped with M antennas situated d meters apart on the (x-y) plane with a DoA $\theta_w$, w={1, 2, ..., W}. Let N be the number of received samples at a sampling frequency $f_s$. The received signal at the $i^{th}$ antenna can be expressed as $$r_i(t) = \sum_{w=1}^{W} s_w(t)\vartheta_i(\theta_w) + n(t)$$

where n(t) is the additive white gaussian noise, $s_w(t)$ is the jammer signal from source w, and $\vartheta_i(\theta_w)=e^{-1(i-1)2\pi d \sin \theta_w/\lambda}$ is the steering function of the $i^{th}$ antenna. The fast Fourier transform (FFT) of the N-point received signal is obtained as $\hat{r}_i(t)=F\{r_i(t)\}$, where $r_i(t)$ is the N-point received signal vector at $i^{th}$ antenna. This can be written in matrix form as R=VS+N, where R=[$\hat{r}_1$(t), $\hat{r}_2$(t), ..., $\hat{r}_M$(t)]$^T$—array output data
S=[$s_1$(t), $s_2$(t), ..., $s_W$(t)]$^T$—emitted signal from W jammer sources $$V = [\vartheta(\theta_1), \vartheta(\theta_2), \ldots, \vartheta(\theta_W)]^T = \begin{bmatrix} 1 & 1 & & 1 \\ e^{-j2\pi d\sin\theta_1/\lambda} & e^{-j2\pi d\sin\theta_2/\lambda} & \ldots & e^{-j2\pi d\sin\theta_W/\lambda} \\ \ldots & \ldots & & \ldots \\ e^{-j(M-1)2\pi d\sin\theta_1/\lambda} & e^{-j(M-1)2\pi d\sin\theta_2/\lambda} & \ldots & e^{-j(M-1)2\pi d\sin\theta_W/\lambda} \end{bmatrix}^T.$$

The array output covariance matrix can be obtained by sample averaging the array output data as $$Rcov=(1/N)RR^H$$

The signal and noise subspaces are obtained by eigendecomposing the array output covariance matrix. The eigenvalue-eigen vectors are sorted in descending order, where the first W columns corresponding to the highest eigenvalues contribute to the signal subspace while the remaining (M−W) columns correspond to noise subspace. To account for uncorrelated jammer sources or low signal-to-noise ratio scenarios, an enhanced MUSIC algorithm is disclosed which considers a transition matrix to perform conjugate reconstruction of covariance matrix such as $$R_c = R_{cov} + \mathcal{T} R_{cov}^* \mathcal{T}, \text{ where } \mathcal{T} = \begin{bmatrix} 0 & 0 & \ldots & 1 \\ 0 & 0 & \ldots & 0 \\ \ldots & \ldots & \ldots & \ldots \\ 1 & 0 & \ldots & 0 \end{bmatrix} \text{ and}$$

$R_{cov}^*$ is the complex conjugate of $R_{cov}$. Thus, the new noise subspace ($\psi_N$) is computed for $R_c$. The spatial spectrum density takes the form, $$S(\theta) = \frac{1}{\partial^H(\theta) \psi_N \psi_N^H \partial(\theta)}$$

The spatial spectrum function is strongly dependent on the incident angle of arrivals of the jammer sources. The localization module performs a 1D dimensional search along θ to accurately estimate the directions contributing to the maximum spatial spectrum density. The estimated directions can be leveraged by the robot 502 steering the ARROW 300 away from the jammers.

Figure 25:
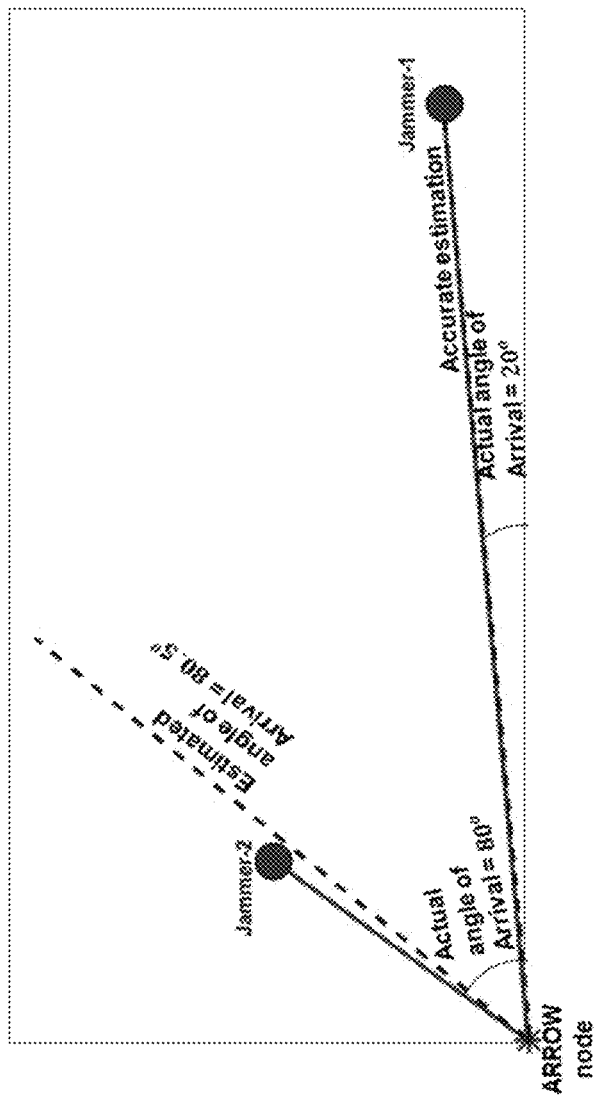
FIG. 25 shows an ARROW node localizing two jammer sources according to embodiments of the disclosure.

The efficacy of ARROW 300 in localizing jammer sources under varying channel conditions was evaluated. Under the assumption of an ISM band 914 MHz operation, the localization was evaluated for single and double jammer sources. The depiction in FIG. 25 shows an ARROW node 500 localizing two jammer sources incident at an angle of arrival 20° and 80°. The dotted line shows the estimated direction of arrival. The results indicate near accurate estimation of the two jammer sources simultaneously.

Figure 26:
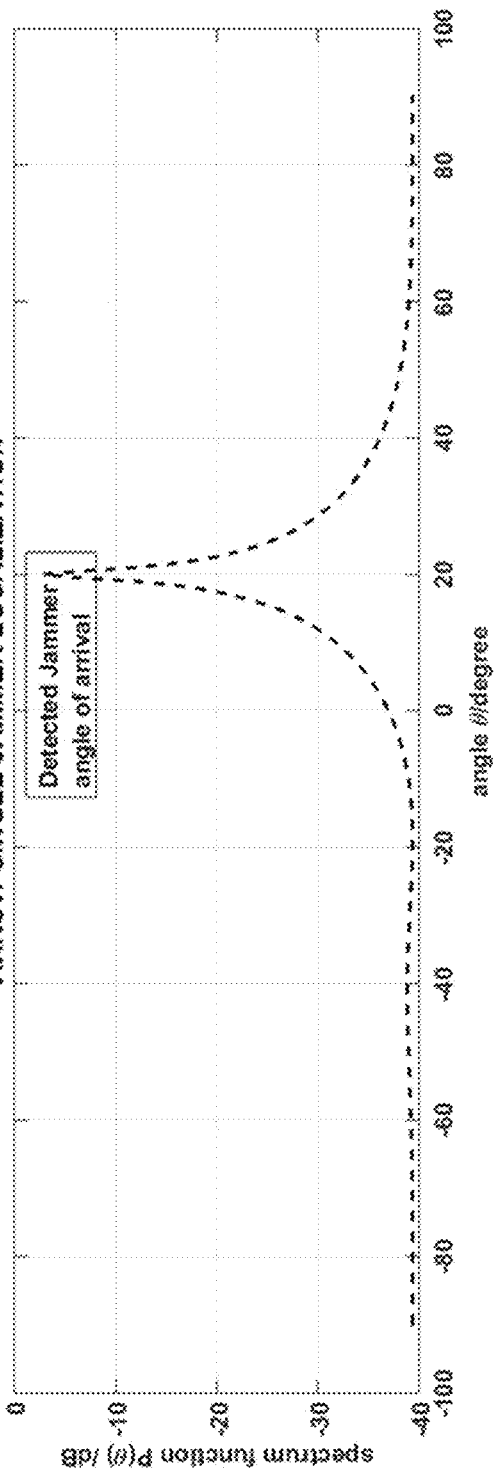
FIG. 26 depicts a spatial spectrum function plot for single jammer localization according to embodiments of the disclosure.
Figure 27:
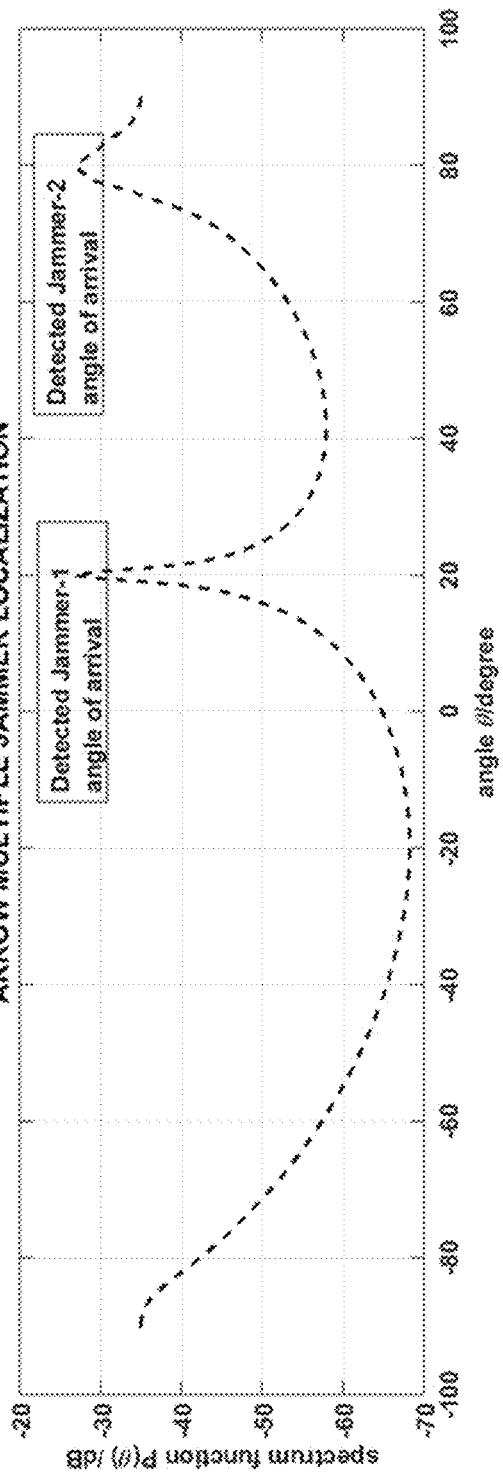
FIG. 27 depicts a spatial spectrum function plot for multiple jammer localization according to embodiments of the disclosure.

FIGS. 26 and 27 show the spatial spectrum function plot for single and multiple jammer localization. As mentioned before, the peaks of the spatial spectrum density yield the angle of arrival of the incident jammer signals. The single peak corresponding to 20° indicates signal arrival at a 20° direction while double peaks corresponding to 20° and 80° indicate jammer signals arriving from those directions. An ARROW node 500 equipped with a jammer localization module 600 will therefore have the capability to resolve as many jammers depending on the number of antennas on board or with the adoption of virtual array techniques. At a minimum, the ARROW radios are envisioned to be a 2×2 MIMO system which with the adoption of virtual array approaches can enhance the jammer localization capability.

The systems described herein provide many technical advantages, including, for example:
1) ARROW can operate at twice the throughput of any other MIMO device that operates using Alamouti or similar rate-1 code in the same operating environment.
2) The complexity of the STBC decoder is very low to the order of $\mathcal{O}(M)$, which is significantly low compared to other 2×2 rate-2 STBCs such as Matrix-C, Golden-ML, and Golden-near ML.
3) Combining STBC with beamforming results in a 2D eigen-beamformer that enjoys the benefit of both schemes without any complexity increase or rate reduction. A beamforming and coding gain of 10 dB was achieved at a bit error rate of $10^{-3}$.
4) Full-band precoding guarantees a lower error rate performance along with a 17 dB lower SJNR operation implying enhanced jammer resilience. Multiband precoding demonstrated a reduced error curve with a 20 dB lower SJNR of operation.
5) The ARROW protocol stack is designed to enable mobile ad hoc network (MANET) capability to the deployed ARROW nodes.
6) The capability of adaptive routing to switch to multihop when it detects a decline in the packet delivery ratio during bad link quality allows it to maintain connectivity unlike the conventional non-adaptive routing which suffers link breakage due to its non-adaptive nature.
7) In real tactical scenarios where the channel conditions can deteriorate dynamically, the agile adaptive protocol stack of the ARROW will maintain connectivity delivering acceptable throughput rates while conventional systems will suffer link breakage.
8) ARROW attains a throughput of 16.64 Mbps (twice that of conventional) in a good channel state and 3.02 Mbps under poor channel conditions.
9) An ARROW node equipped with a localization module will have the capability to resolve as many jammers depending on the number of antennas on board or with the adoption of virtual array techniques.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A communication system, comprising:
a transceiver assembly including a transmitter component, the transmitter component comprising:
a rate-2 orthogonal space-time block code (OSTBC) encoder for processing a set of information symbols to produce a set of encoded signals;
a precoder module coupled to an output of the rate-2 OSTBC encoder for modifying a signal-to-jammer plus noise ratio (SJNR) of the set of encoded signals; and
an eigen-beamformer module coupled to an output of the precoder module, and configured to generate a set of symbols for transmission via a set of eigenmodes of a channel covariance matrix for the transceiver assembly.

2. The communication system of claim 1, further comprising a multiple input multiple output (MIMO) system architecture.

3. The communication system of claim 1, wherein the precoder module further comprises:
a full-band precoder configured to raise a signal power on all subcarriers of the transmitter component; and
a multi-band precoder configured to raise a signal power on a subset of the subcarriers of the transmitter component.

4. The communication system of claim 1, wherein the transmitter component further comprises:

a forward error correction (FEC) encoder for FEC encoding a set of input bits; and a quadrature amplitude modulation (QAM) modulator coupled to an input of the rate-2 OSTBC encoder for QAM modulating an output of the FEC encoder to generate the set of information symbols.

5. The communication system of claim 4, wherein the FEC encoder comprises a Turbo encoder.

6. The communication system of claim 1, wherein the transceiver assembly is coupled to an unmanned vehicle.

7. The communication system of claim 6, further comprising a jammer localization module configured to direct the unmanned vehicle away from a jamming source.

8. The communication system of claim 1, further comprising a communication protocol stack communicatively coupled to the transmitter component, the communication protocol stack configured to switch the transmitter component between direct link and multihop link operating modes based on a detected jamming signal or a channel condition of a communications channel.

9. The communication system of claim 4, further comprising a communication protocol stack communicatively coupled to the transmitter component, the communication protocol stack configured to modify a modulation order of the QAM modulator of the transmitter component based on a channel condition of a communications channel.

10. The communication system of claim 1, wherein the transceiver assembly further includes a receiver component, the receiver component further comprising:
a decoder module for decoding a set of received symbols;
a beamformed OSTBC decoder coupled to an output of the decoder module;
a QAM demodulator coupled to an output of the beamformed OSTBC decoder; and
an FEC decoder coupled to an output of the decoder for outputting a set of decoded bits.

11. The communication system of claim 1, further comprising a mobile ad hoc network comprising a plurality of the transceiver assemblies.

12. A method for transmitting a signal via a transmitter component of a transceiver assembly, the method comprising:
converting a set of information symbols into a set of corresponding orthogonal space-time block code (OSTBC) symbols;
precoding the set of OSTBC symbols to increase a signal to jammer noise ratio (SJNR) of the OSTBC symbols; and
generating, via an eigen-beamformer, the signal for transmission based on the precoded OSTBC symbols, the eigen-beamformer being configured to generate the signal via a set of eigenmodes of a channel covariance matrix for the transceiver assembly.

13. The method of claim 12, wherein precoding the set of OSTBC symbols further comprises:
precoding, via a full-band decoder, the set of OSTBC symbols to raise a signal power on all subcarriers of the transmitter component; and
precoding, via a multi-band precoder, the set of OSTBC symbols to raise a signal power on a subset of the subcarriers of the transmitter component.

14. The method of claim 12, further comprising:
forward error correction (FEC) encoding a set of input bits; and
quadrature amplitude modulating the FEC encoded input bits to generate the set of information symbols.

15. The method of claim 14, further comprising modifying a modulation order of the quadrature amplitude modulating based on a channel condition of a communications channel.

16. The method of claim 12, further comprising switching the transmitter component between direct link and multihop link operating modes based on a detected jamming signal or a channel condition of a communications channel.

17. The method of claim 12, further comprising:
localizing an incoming jammer signal; and
moving the transmitting component away from the incoming jammer signal.

18. The method of claim 12, further comprising establishing a mobile ad hoc network with adaptive routing using a plurality of the transceiver assemblies.

19. An adaptive transmitter, comprising:
a forward error correction (FEC) encoder for FEC encoding a set of input bits;
a quadrature amplitude modulation (QAM) modulator for QAM modulating an output of the FEC encoder to generate a set of information symbols;
a rate-2 orthogonal space-time block code (OSTBC) encoder for processing the set of information symbols to produce a set of encoded signals;
a precoder module coupled to an output of the rate-2 OSTBC encoder for modifying a signal-to-jammer plus noise ratio (SJNR) of the set of encoded signals, the precoder module including a full-band precoder and a multi-band precoder; and
an eigen-beamformer module coupled to an output of the precoder module, and configured to generate a set of symbols for transmission via a set of eigenmodes of a channel covariance matrix for the transmitter.

20. The adaptive transmitter of claim 19, further comprising a communication protocol stack communicatively coupled to the transmitter, the communication protocol stack configured to:
switch the transmitter between direct link and multihop link operating modes based on a detected jamming signal or a channel condition of a communications channel; and/or
modify a modulation order of the QAM modulator of the transmitter based on a channel condition of a communications channel.

21. A transmitter, comprising:
an orthogonal space-time block code (OSTBC) encoder for processing a set of information symbols to produce a set of encoded signals;
a precoder for modifying a signal-to-jammer plus noise ratio (SJNR) of the set of encoded signals to produce a set of precoded signals; and
an eigen-beamformer configured to generate, based on the set of precoded signals, a set of symbols for transmission via a set of eigenmodes of a channel covariance matrix.

22. The transmitter of claim 21, further comprising a system for:
detecting at least one of a detected jamming signal or a channel condition of a communications channel; and
automatically switching the transmitter between a direct link operating mode and a multihop link operating mode based on at least one of the detected jamming signal or the detected channel condition of the communications channel.

23. The transmitter according to claim 22, further comprising a system for modifying a modulation order of a quadrature amplitude modulator of the transmitter based on a detected channel condition of the communications channel.

* * * * *